United States Patent
Inoue

(10) Patent No.: US 9,485,430 B2
(45) Date of Patent: Nov. 1, 2016

(54) IMAGE PROCESSING DEVICE, IMAGING DEVICE, COMPUTER READABLE MEDIUM AND IMAGE PROCESSING METHOD

(71) Applicant: FUJIFILM CORPORATION, Minato-ku, Tokyo (JP)

(72) Inventor: Kazuki Inoue, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/576,213

(22) Filed: Dec. 19, 2014

(65) Prior Publication Data

US 2015/0103210 A1 Apr. 16, 2015

Related U.S. Application Data

(63) Continuation of application No. PCT/JP2013/069447, filed on Jul. 17, 2013.

(30) Foreign Application Priority Data

Sep. 19, 2012 (JP) .................................. 2012-205869

(51) Int. Cl.
*H04N 5/232* (2006.01)
*H04N 9/04* (2006.01)
(Continued)

(52) U.S. Cl.
CPC .......... *H04N 5/23293* (2013.01); *G02B 7/346* (2013.01); *G03B 13/28* (2013.01); *H04N 5/23212* (2013.01); *H04N 5/23229* (2013.01); *H04N 9/045* (2013.01)

(58) Field of Classification Search
CPC ................... H04N 5/23293; H04N 5/23229; H04N 5/23212; H04N 9/045; G02B 7/346; G03B 15/00; G03B 17/18; G03B 13/36
See application file for complete search history.

(56) References Cited

U.S. PATENT DOCUMENTS 8,085,337 B2 * 12/2011 Onuki ............... H04N 5/23212
348/222.1
2009/0153693 A1 6/2009 Onuki et al.
(Continued)

FOREIGN PATENT DOCUMENTS

JP 2001-309210 A 11/2001
JP 2009-147665 A 7/2009
(Continued)

OTHER PUBLICATIONS

International Preliminary Report for Patentability issued in International Application No. PCT/JP2013/069447 on Feb. 4, 2014.
(Continued)

*Primary Examiner* — Twyler Haskins
*Assistant Examiner* — Peter Chon
(74) *Attorney, Agent, or Firm* — Solaris Intellectual Property Group, PLLC

(57) ABSTRACT

An image processing device includes a generation unit that generates a first display image on the basis of image signals from an imaging element that includes first and second pixel groups at which a subject image is pupil-divided and formed, and a second display image to be used for focus confirmation; a parallax calculation unit that calculates a parallax between pixels of a first image and pixels of a second image; a display unit that displays images; and a display control unit, wherein the generation unit generates the second display image by arranging the first divided image, which is a first image part, and the second divided image, which is the second image excluding regions corresponding to the first divided image, to be shifted by amounts corresponding to the parallax in opposing directions in an intersectional direction intersecting a division direction.

14 Claims, 21 Drawing Sheets

(51) Int. Cl.
*G02B 7/34* (2006.01)
*G03B 15/00* (2006.01)
*G03B 17/18* (2006.01)
*G03B 13/36* (2006.01)
*G03B 13/28* (2006.01)

(56) References Cited

U.S. PATENT DOCUMENTS

| | | | |
|---|---|---|---|
| 2009/0153720 A1* | 6/2009 | Suzuki | G06T 11/00 348/333.01 |
| 2012/0113314 A1 | 5/2012 | Onuki et al. | |
| 2012/0133813 A1* | 5/2012 | Nagano | H04N 5/3696 348/311 |
| 2015/0036025 A1* | 2/2015 | Oshima | G03B 13/06 348/239 |

FOREIGN PATENT DOCUMENTS

| | | |
|---|---|---|
| JP | 2009-163220 A | 7/2009 |
| JP | 2009-276426 A | 11/2009 |
| JP | 2012-113064 A | 6/2012 |

OTHER PUBLICATIONS

English language translation of the following: Office action dated Jan. 5, 2016 from the JPO in a Japanese patent application corresponding to the instant patent application.

\* cited by examiner

FIG.7

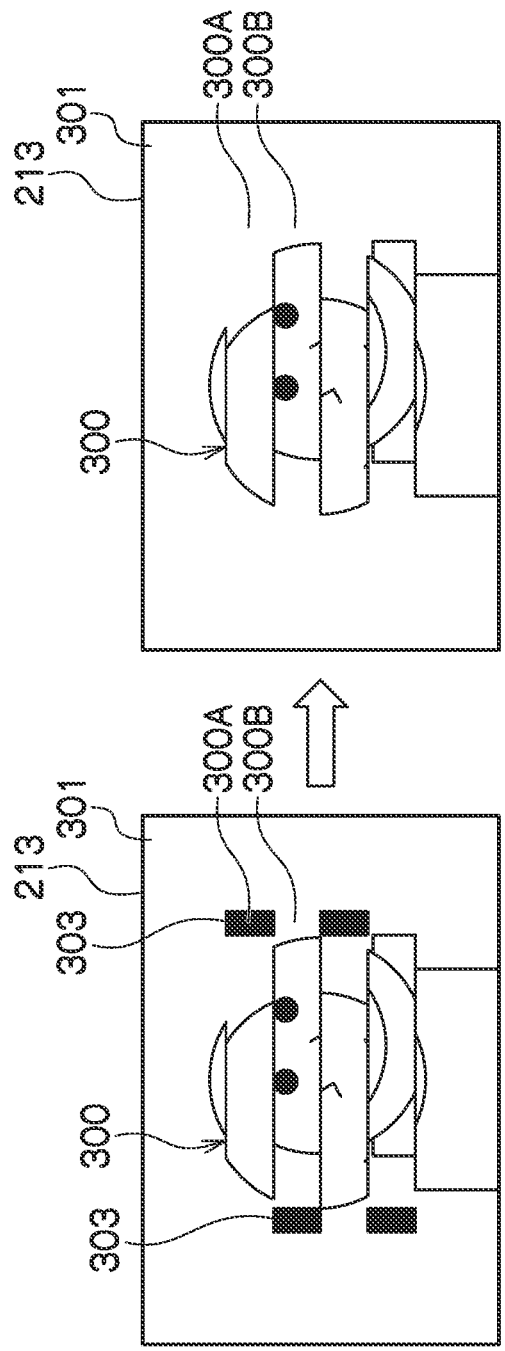

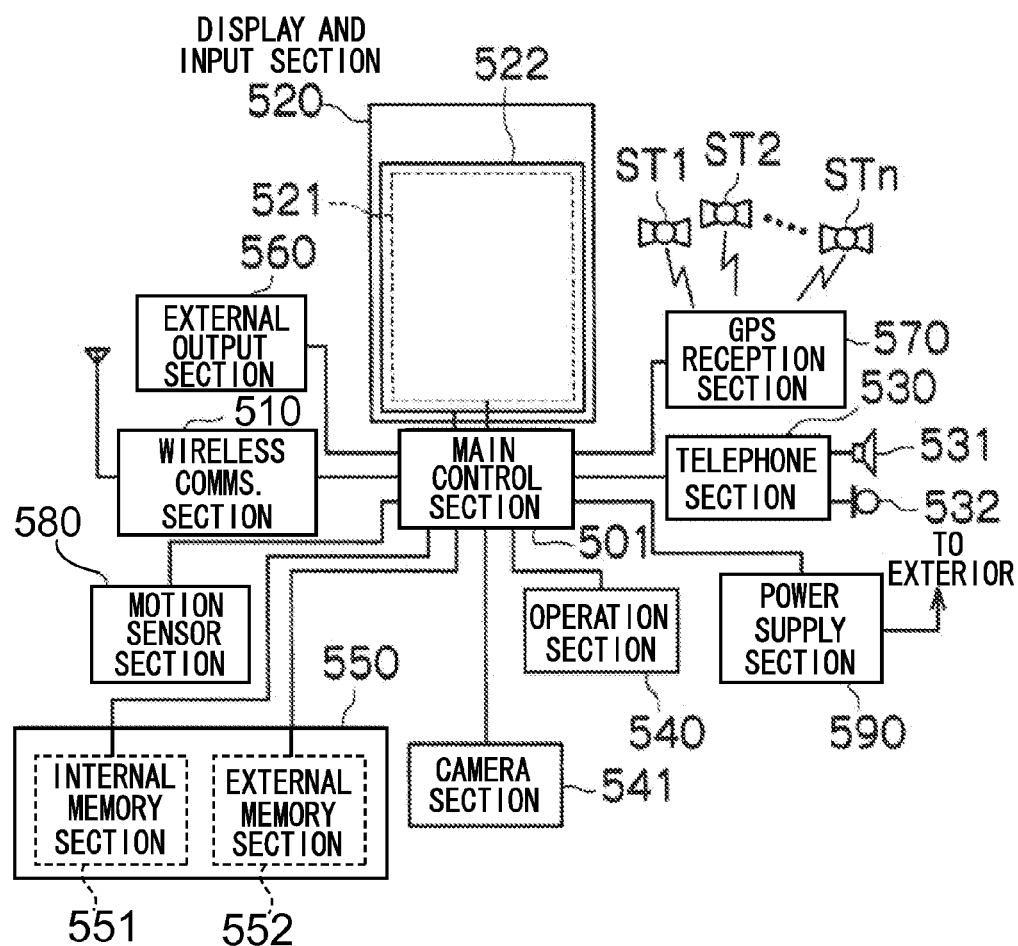

IMAGE PROCESSING DEVICE, IMAGING DEVICE, COMPUTER READABLE MEDIUM AND IMAGE PROCESSING METHOD

CROSS-REFERENCE TO RELATED APPLICATIONS

This application is a continuation application of International Application No. PCT/JP2013/069447, filed Jul. 17, 2013, the disclosure of which is incorporated herein by reference in its entirety. Further, this application claims priority from Japanese Patent Application No. 2012-205869, filed Sep. 19, 2012, the disclosure of which is incorporated herein by reference in its entirety.

TECHNICAL FIELD

The present invention relates to an image processing device, an imaging device, a computer readable medium and an image processing method, and particularly relates to: an image processing device that generates and displays an image for confirming a focus state of a subject image; an imaging device that displays the image for confirming a focus state and the subject image; a computer readable medium storing a program to be executed by the image processing device; and an image processing method that generates and displays the image for confirming a focus state.

BACKGROUND ART

Heretofore, there have been calls from users of imaging devices, such as digital cameras, portable telephones equipped with cameras and the like, for the development of technologies with which a focus state of a subject image may be confirmed while the focus is being adjusted. To satisfy these calls, a technique has been employed of displaying a portion of the subject image that should be in focus magnified at a display unit of an imaging device, making it easier to confirm the focus state.

However, in a case in which this technique is used, it is not possible to see the whole of the subject image while confirming the focus state. Therefore, it is difficult to take account of the whole of the subject image while confirming the focus state.

In these imaging devices, to make operations to perform focus adjustment manually easier, a technology that displays a split image within a live view image (a through image) has come into use. The term "split image" includes an image in which a portion of a left eye image and a portion of a right eye image corresponding to predetermined regions are combined. In the split image, a shift in a direction in which parallax is produced is generated between the left eye image and the right eye image in accordance with a focus state. Using this technology, a user confirms a focus state by observing shifting between the left eye image and the right eye image in the split image.

As an imaging device employing this technology, Japanese Patent Application Laid-Open (JP-A) No. 2001-309210 discloses an imaging device that includes: an imaging section that acquires an image of a subject in the form of imaging signals via an optical system; a detection section that detects an offset amount corresponding to a distance between an image plane of the subject in the optical system and a light detection plane of the imaging section; a display unit that displays an image of the subject at a display screen on the basis of the imaging signals acquired by the imaging section; and a display change unit that utilizes the image of the subject and changes display contents of a display change region in accordance with the offset amount, the display change region being a partial region of the display screen. According to this imaging device, when focus adjustment is being performed manually, the focus adjustment may be performed with a similar feel to focus adjustment that utilizes a split image.

JP-A No. 2009-147665 discloses an imaging device that includes an image acquisition unit, a display unit and a split image generation unit. The image acquisition unit respectively photoelectrically converts a first subject image and a second subject image, which are formed by light flux divided by a pupil division unit from light flux from an imaging optical system, to generate a first image and a second image. The image acquisition unit also photoelectrically converts a third subject image, which is formed by light flux that has not been divided by the pupil division unit, to generate a third image. The display unit displays the third image. The split image generation unit generates a split image to be displayed within the third image. This imaging device utilizes the first and second images for the split image generation unit to generate the split image, and adds color information extracted from the third image to the split image. According to this imaging device, usability when focus adjustment is being performed manually may be improved.

JP-A No. 2009-163220 discloses an imaging device that includes an image acquisition unit, a display unit and a processing unit. The image acquisition unit respectively photoelectrically converts a first subject image and a second subject image, which are formed by light flux divided by a pupil division unit from light flux from an imaging optical system, to generate a first image and a second image. The display unit displays an image. The processing unit causes a superimposed image in which the first and second images are superimposed to be displayed at the display unit. According to this imaging device, visibility of a split image may be improved.

SUMMARY OF INVENTION

In the technologies disclosed in JP-A Nos. 2001-309210, 2009-147665 and 2009-163220, in order to display a split image, depending on the subject image, only a split image in a pre-specified display region is displayed. In such a case, a user may not be able to correctly judge a shift amount of the aforementioned shifting in the split image, in which case it may not be possible for the user to perform focus adjustment with high accuracy.

The present invention provides an image processing device, an imaging device, a computer readable medium storing a program and an image processing method with which manual focus adjustment may be performed with high accuracy.

To achieve the object described above, the image processing device relating to the present invention includes: a generation unit that generates a first display image based on image signals outputted from an imaging element that includes first and second pixel groups, at which a subject image passing through first and second regions of an imaging lens is pupil-divided and respectively formed, and generates a second display image from first and second images based on image signals outputted from the first and second pixel groups, the second display image being used for focus confirmation; a parallax calculation unit that calculates a parallax representing an offset amount between pixels of the first image and corresponding pixels of the second image; a display unit that displays images; and a display control unit that controls to display the first display image generated by the generation unit at the display unit and to display the second display image generated by the generation unit within a display region of the first display image, wherein the generation unit generates the second display image by arranging a first divided image, which is one of a plurality of divided images obtained by dividing the first image in a pre-specified division direction, and a second divided image, which is an image in which regions corresponding to the first divided image are excluded from a plurality of divided images obtained by dividing the second image in the same manner as the first image, to be shifted by an amount corresponding to the parallax in opposing directions in an intersectional direction that intersects with the division direction.

According to the image processing device relating to the present invention, the generation unit generates the first display image on the basis of image signals outputted from the imaging element containing the first and second pixel groups, at which a subject image that has passed through the first and second regions of the imaging lens is pupil-divided and respective subject images are formed, and generates the second display image to be used for focus confirmation from the first and second images on the basis of image signals outputted from the first and second pixel groups. The parallax calculation unit calculates a parallax representing an offset amount between the pixels of the first image and the corresponding pixels of the second image. The display control unit performs control to cause the first display image generated by the generation unit to be displayed at the display unit, and performs control to cause the second display image generated by the generation unit to be displayed within a display region of the first display image.

In the present invention, the first divided image is one of plural divided images obtained by dividing the first image in the pre-specified division direction, and the second divided image is an image in which regions corresponding to the first divided image are excluded from the plurality of divided images obtained by dividing the second image in the same manner as the first image. The generation section generates the second display image with the first divided image and the second divided image being arranged to be shifted in opposing directions in the intersectional direction intersecting the division direction by amounts corresponding to the parallax.

Thus, the image processing device relating to the present invention generates the first display image (corresponding to the image for confirming the focus state) with a first image part and a second image part arranged to be shifted in opposing directions. Therefore, according to the image processing device relating to the present invention, the shifts of the first image and the second image may be easier to see, and manual focus adjustment may be performed more accurately than in a case in which the present invention is not applied.

In the image processing device relating to the present invention, the generation unit may arrange the first divided image and the second divided image alternatingly in the division direction to generate the first display image. Thus, visibility of the first display image may be improved.

In the image processing device relating to the present invention, the parallax calculation unit may calculate the parallax in a pre-specified region that includes a boundary between the first divided image and the second divided image. Thus, the first image and the second image may be shifted by shift amounts corresponding to offset positions.

In the image processing device relating to the present invention, the generation unit may extract a pixel group in which differences in pixel values between adjacent pixels in at least one of the first image and the second image are equal to or more than a pre-specified first threshold value and the pixels are successively arranged to a number equal to or more than a pre-specified second threshold value in the same direction, and generate the second display image with the division direction being any one direction in which the pixels of the extracted pixel group are successively arranged. Thus, manual focus adjustment may be performed more accurately.

In the image processing device relating to the present invention, the generation unit may generate the second display image, with the amount corresponding to the parallax being a value for which the parallax calculated by the parallax calculation unit is multiplied by a pre-specified coefficient that is greater than 1. Thus, the shifts may be made easy to see even in a case in which the parallax amount of the parallax between the first image and the second image is small.

In the image processing device relating to the present invention, the generation unit may generate the second display image, with the amount corresponding to the parallax being a value for which the parallax calculated by the parallax calculation unit is multiplied by a coefficient, which coefficient becomes larger as the parallax becomes larger, becomes larger at a smaller rate as the parallax becomes larger, and is greater than 1. Thus, the shifts may be made easy to see even in a case in which the parallax amount of the parallax between the first image and the second image is small.

In the image processing device relating to the present invention, the generation unit may extract a pixel group, in which differences in pixel values between adjacent pixels in at least one of the first image and the second image are equal to or more than a pre-specified threshold value, and generate the second display image with a region that is a generation object of the second display image being a region, of regions with a pre-specified size, in which a total area of the pixel group contained in the region is the largest. Thus, manual focus adjustment may be performed more accurately.

The image processing device relating to the present invention may further include a face region extraction unit that extracts a face region corresponding to a face from at least one of the first image and the second image, wherein the generation unit generates the second display image with a region that is a generation object of the second display image being a face region extracted by the face region extraction unit. Thus, focusing may be performed using a face region, which is generally a region that is intended to be in focus.

In the image processing device relating to the present invention, the generation unit may generate the second display image by arranging a third divided image and a fourth divided image to be shifted by a distance corresponding to the parallax in opposing directions in the intersectional direction, the third divided image being one of a plurality of divided images obtained by dividing a third image in the division direction, the third image being based on image signals outputted from a third pixel group at which the subject image is formed without being pupil-divided and that outputs image signals representing the third image, and the fourth divided image being an image in which regions corresponding to the third divided image are excluded from the plurality of divided images. Thus, focusing may be performed using an image that is obtained by forming a subject image without pupil division.

In the image processing device relating to the present invention, the generation unit may generate a third display image that is a third image based on image signals outputted from a third pixel group, at which the subject image is formed without being pupil-divided and that outputs image signals representing the third image, and the display control unit, before controlling to display the first display image generated by the generation unit at the display unit and to display the second display image generated by the generation unit within the display region of the first display image, may further control to display the third display image generated by the generation unit at the display unit. Thus, an image that is obtained by forming a subject image without pupil division may be displayed.

In the image processing device relating to the present invention, the display control unit may further control to display an image representing an intersectional direction end portion of the second display image at the display unit. Thus, the shifts of the first image and the second image may be seen more accurately.

In the image processing device relating to the present invention, in a case in which the second display image is displayed to be superimposed on the first display image in a second display region, which is a display region in a display region of the display unit that excludes a pre-specified first display region in which the second display image is displayed, the display control unit may display the second display image with the pixel values of pixels in a region of the first display region in which pixels corresponding to the second display image are not present, due to the first divided image and the second divided image being arranged to be shifted, being pixel values of pixels corresponding to that region in the first display image. Thus, the aesthetic quality of the first display image may be improved.

Further, to achieve the object described above, an imaging device according to the present invention includes: the image processing device according to the present invention; an imaging lens; and an imaging element that acquires a subject image passing through the imaging lens as image signals.

Thus, according to the imaging device relating to the present invention, operations are similar to the image processing device relating to the present invention and thus, similarly to the image processing device relating to the present invention, manual focus adjustment may be performed more accurately than in a case in which the present invention is not applied.

Further, to achieve the object described above, a computer readable medium relating to the present invention stores a program causing a computer to function as: a generation unit that generates a first display image based on image signals outputted from an imaging element that includes first and second pixel groups, at which a subject image passing through first and second regions of an imaging lens is pupil-divided and respectively formed, and generates a second display image from first and second images based on image signals outputted from the first and second pixel groups, the second display image being used for focus confirmation; a parallax calculation unit that calculates a parallax representing offset amounts between pixels of the first image and corresponding pixels of the second image; and a display control unit that controls to display the first display image generated by the generation unit at a display unit and to display the second display image generated by the generation unit within a display region of the first display image, wherein the generation unit generates the second display image by arranging a first divided image, which is one of a plurality of divided images obtained by dividing the first image in a pre-specified division direction, and a second divided image, which is an image in which regions corresponding to the first divided image are excluded from a plurality of divided images obtained by dividing the second image in the same manner as the first image, to be shifted by an amount corresponding to the parallax in opposing directions in an intersectional direction that intersects with the division direction.

Thus, according to the computer readable medium relating to the present invention, the computer is operated in the same manner as the image processing device relating to the present invention and thus, similarly to the image processing device relating to the present invention, manual focus adjustment may be performed more accurately than in a case in which the present invention is not applied.

Further, to achieve the object described above, an image processing method includes: generating a first display image based on image signals outputted from an imaging element that includes first and second pixel groups, at which a subject image passing through first and second regions of an imaging lens is pupil-divided and respectively formed, and generating a second display image from first and second images based on image signals outputted from the first and second pixel groups, the second display image being used for focus confirmation; calculating a parallax representing offset amounts between pixels of the first image and corresponding pixels of the second image; controlling to display the first display image generated by the generating at a display unit and to display the second display image generated by the generation unit within a display region of the first display image, wherein the generating includes generating the second display image by arranging a first divided image, which is one of a plurality of divided images obtained by dividing the first image in a pre-specified division direction, and a second divided image, which is an image in which regions corresponding to the first divided image are excluded from a plurality of divided images obtained by dividing the second image in the same manner as the first image, to be shifted by an amount corresponding to the parallax in opposing directions in an intersectional direction that intersects with the division direction.

Thus, according to the image processing method relating to the present invention, operations are similar to the image processing device relating to the present invention and thus, similarly to the image processing device relating to the present invention, manual focus adjustment may be performed more accurately than in a case in which the present invention is not applied.

According to the present invention, manual focus adjustment may be performed with high accuracy.

BRIEF DESCRIPTION OF DRAWINGS

FIG. 7 is a schematic arrangement diagram showing an example of an arrangement of shading members that are provided at the imaging element of the imaging device in accordance with the exemplary embodiment.

FIG. 22 is a front view showing an example of the display appearance of a split image in accordance with the exemplary embodiment.

FIG. 28 is a block diagram showing an example of the principal structures of an electronic system of the smartphone in accordance with the second exemplary embodiment.

DESCRIPTION OF EMBODIMENTS

Herebelow, examples of embodiments of the imaging device relating to the present invention are described in accordance with the attached drawings.

First Exemplary Embodiment

Figure 1:
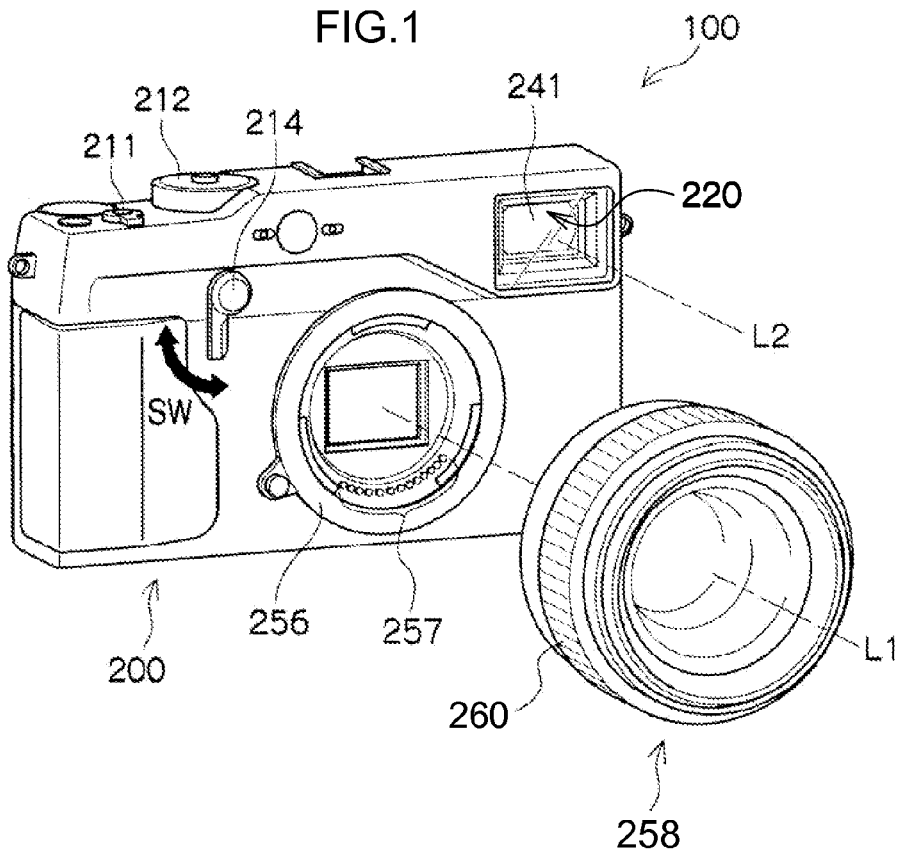
FIG. 1 is a perspective diagram showing an example of the exterior of an imaging device, which is an interchangeable lens-type camera, in accordance with a first exemplary embodiment.

An imaging device 100 according to the present exemplary embodiment is an interchangeable lens-type camera. As shown in FIG. 1, the imaging device 100 includes a camera main body 200 and an interchangeable lens 258 (an imaging lens and a focusing lens 260) that is interchangeably mounted at the camera main body 200. The imaging device 100 is a digital camera that does not include a reflex mirror. The camera main body 200 includes a Hybrid Viewfinder (registered trademark) 220. The Hybrid Viewfinder 220 referred to herein indicates, for example, a viewfinder that selectively employs an optical viewfinder (hereinafter referred to as "the OVF") and an electrical viewfinder (hereinafter referred to as "the EVF").

The camera main body 200 and the interchangeable lens 258 are interchangeably attached by a mount 256 provided at the camera main body 200 being connected with a mount 346 at the interchangeable lens 258 side (see FIG. 3), which corresponds with the mount 256. The focusing ring 260 is provided at a lens barrel of the interchangeable lens 258. The focusing lens is moved in an optical axis direction in accordance with turning operations of the focusing ring 260, and light from a subject may be focused on an imaging element 20 (see FIG. 3), which is described below, at a focus position that corresponds with a subject distance.

A viewfinder window 241 of the OVF included in the Hybrid Viewfinder 220 is provided at a front face of the camera main body 200. A viewfinder switching lever 214 is also provided at the front face of the camera main body 200. When the viewfinder switching lever 214 is turned in the direction of arrow SW, the viewfinder is switched (described below) between an optical system that enables viewing with the OVF and an electronic system that enables viewing with the EVF (a live view image). An optical axis L2 of the OVF and an optical axis L1 of the interchangeable lens 258 are different optical axes. An upper face of the camera main body 200 principally includes a release button 211 and a dial 212 that is for specifying an imaging mode, a replay mode and the like.

The release button 211 is structured to enable the detection of a two-stage pressing operation, to a state in which the release button 211 is pressed from a standby position to an intermediate position (a half-pressed position), and a state in which the release button 211 is pressed beyond the intermediate position to a maximum pressing position (a fully pressed position). Hereinafter, the state in which the release button 211 is pressed from the standby position to the half-pressed position is referred to as "the half-pressed state", and the state in which the release button 211 is pressed from the standby position to the fully pressed position is referred to as "the fully pressed state". In the imaging device 100 according to the present first exemplary embodiment, confirmation screen display processing, which is described below, is executed when the release button 211 is put into the half-pressed state. Subsequently, when the release button 211 continues to the fully pressed state, exposure (imaging) is carried out.

Figure 2:
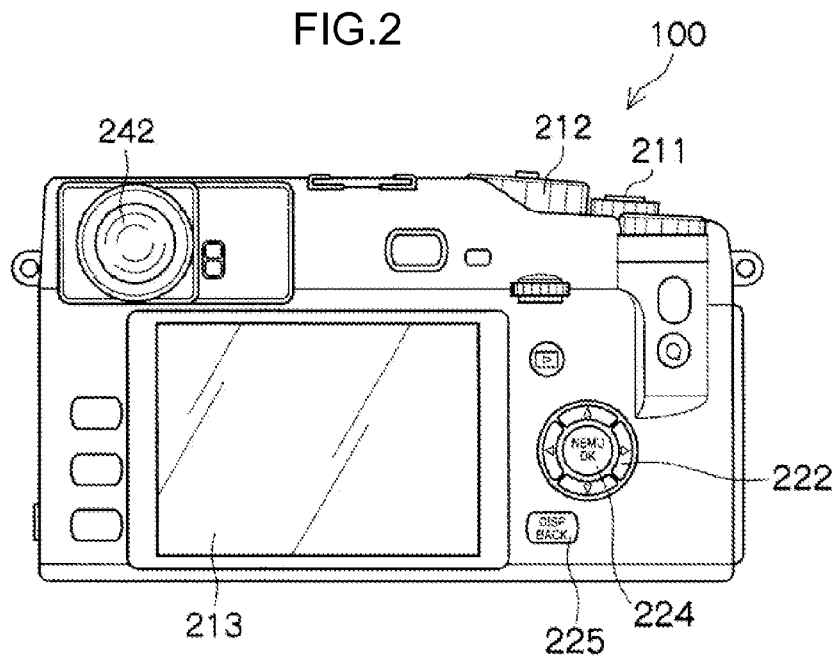
FIG. 2 is a rear view showing a rear face side of the imaging device in accordance with the first exemplary embodiment.

As shown in FIG. 2, a rear face of the camera main body 200 includes a a viewfinder eyepiece unit 242 of the OVF, a display unit 213, a cross-key 222, a menu/OK button 224, and a back/display button 225.

The cross-key 222 functions as a multifunction button that outputs command signals for menu selections, zooming, frame advance and the like. The menu/OK button 224 is an operation button that is equipped both to function as a menu button for commanding the display of a menu on the screen of the display unit 213 and to function as an OK button that commands the confirmation and execution of selection details and the like. The back/display button 225 is used to remove specified objects such as selections and the like and to cancel command details, and is used when returning to an immediately preceding operational state or the like.

The display unit 213 is realized with, for example, an LCD. The display unit 213 is used for the display of a live view image (a through image), which is an example of consecutive frame imaging that is obtained by imaging of consecutive frames when in an imaging mode. The display unit 213 is also used for the display of a still image, which is an example of a single-frame image that is obtained by single-frame imaging when a still frame imaging command is provided. The display unit 213 is also used for the display of replay images when in the replay mode and for the display of menu screens and the like.

Figure 3:
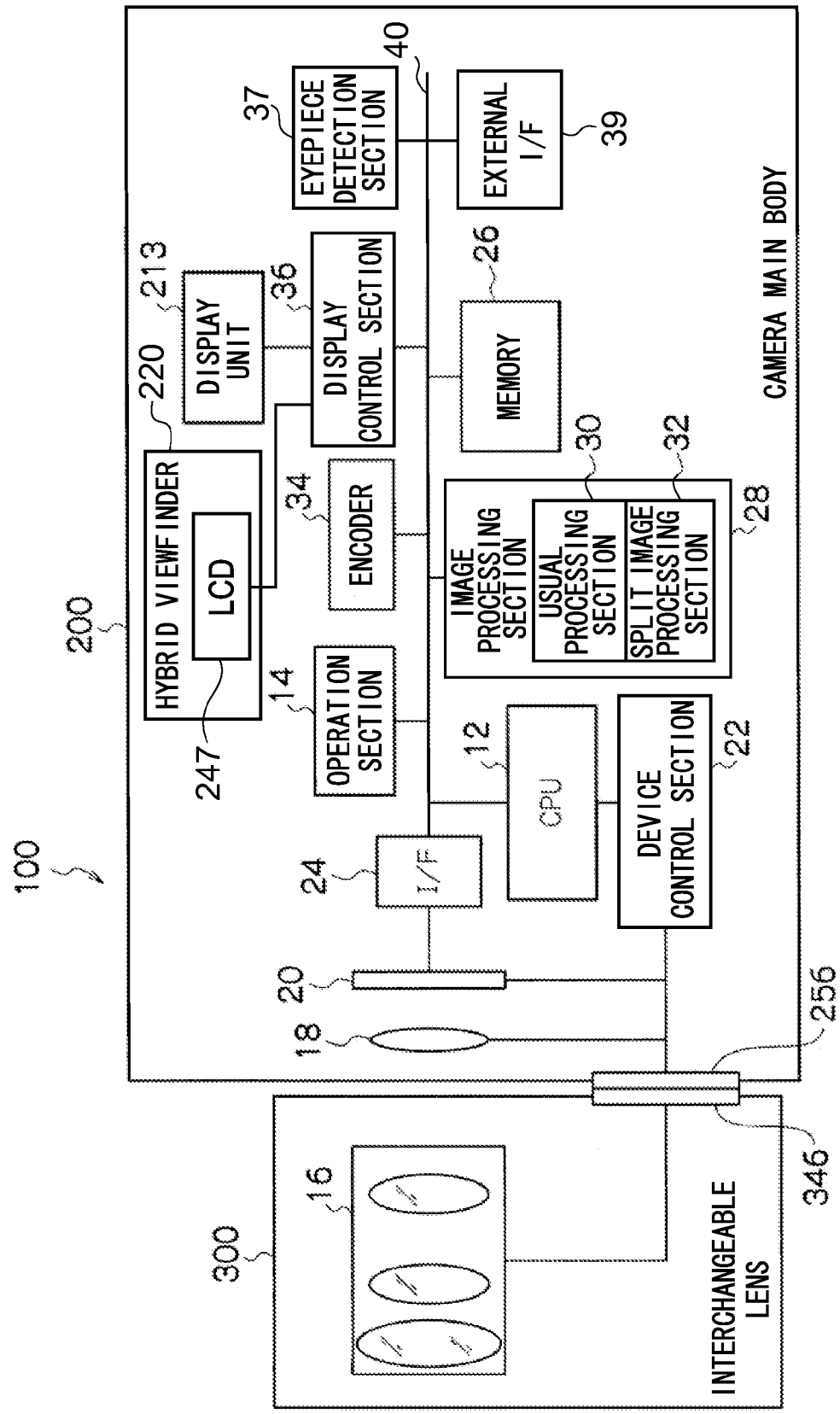
FIG. 3 is a block diagram showing an example of the structures of an electronic system of the imaging device in accordance with the first exemplary embodiment.

The imaging device 100 is a digital camera that records captured still images and video images. Operations of the camera as a whole are supervised and controlled by a central processing unit (CPU) 12, shown in FIG. 3. As is illustrated in FIG. 3, in addition to the CPU 12, the imaging device 100 includes an operation section 14, an interface section 24, a memory 26 and an encoder 34. The imaging device 100 also includes a display control section 36, which is an example of a display control unit relating to the present invention, an eyepiece detection section 37 and an external interface (I/F) 39. The imaging device 100 further includes an image processing section 28, which is an example of a generation unit and a parallax calculation unit relating to the present invention.

The CPU 12, the operation section 14, the interface section 24, the memory 26, the image processing section 28, the encoder 34, the display control section 36, the eyepiece detection section 37 and the external I/F 39 are connected to one another via a bus 40. The memory 26 includes a non-volatile memory region (for example, an EEPROM or the like) in which parameters, programs and the like are memorized, and a volatile memory region (for example, an SDRAM or the like) in which various kinds of information such as images and the like are temporarily memorized.

In the imaging device 100 according to the present first exemplary embodiment, the CPU 12 performs focus control by driving control of a focus adjustment motor such that a contrast value of an image obtained by imaging will be maximized. The CPU 12 calculates autoexposure (AE) information, which is a physical value representing a brightness of the image to be obtained by imaging. When the release button 211 is put into the half-pressed state, the CPU 12 calculates a shutter speed and an F-number corresponding to the brightness of the image represented by the autoexposure information. Then, the CPU 12 specifies exposure conditions by controlling related sections to provide the calculated shutter speed and f-number.

The operation section 14 is a user interface that is operated by an operator when giving various commands to the imaging device 100. The various commands received by the operation section 14 are outputted to the CPU 12 as operation signals. The CPU 12 executes processing in accordance with the operation signals inputted thereto from the operation section 14.

The operation section 14 includes the release button 211, the dial 212, the display unit 213, the viewfinder switching lever 214, the cross-key 222, the menu/OK button 224 and the back/display button 225.

If the imaging mode is set at the dial 212, image light representing a subject is focused on a light detection plane of an imaging element 20 (for example, a CMOS sensor), via an imaging lens 16 and a shutter 18. The imaging lens 16 includes a focusing lens that may be moved by manual operations. Signal charges accumulated at the imaging element 20 are sequentially read out as digital signals corresponding to signal charges (voltages) in accordance with readout signals that are applied from a device control section 22. The imaging element 20 includes an "electronic shutter" function. By operation of the electronic shutter function, a charge accumulation duration of photosensors (i.e., the shutter speed) is controlled by the timings of the readout signals. Although the imaging element 20 according to the present first exemplary embodiment is a CMOS-type image sensor, this is not limiting and the imaging element 20 may be a CCD image sensor.

Figure 4:
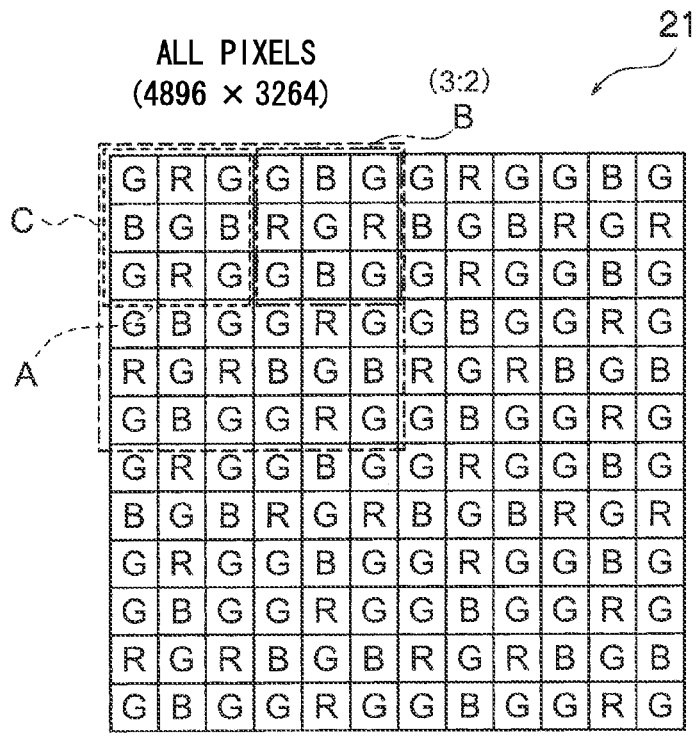
FIG. 4 is a schematic arrangement diagram showing an example of arrangement of a color filter that is provided at an imaging element included in the imaging device in accordance with the exemplary embodiment.

The imaging element 20 includes, for example, a color filter 21 illustrated in FIG. 4. In the example shown in FIG. 4, as an example, the number of pixels employed is 4896 by 3264 pixels and an aspect ratio of 3:2 is employed. However, the number of pixels and the aspect ratio are not limited thus. As shown by the example in FIG. 4, the color filter 21 includes first filters G corresponding with the color green (G), which makes the greatest contribution to providing luminance signals, second filters R corresponding with red (R), and third filters B corresponding with blue (B). An array pattern of the first filters G (hereinafter referred to as "the G filters"), the second filters R (hereinafter referred to as "the R filters"), and the third filters B (hereinafter referred to as "the B filters") is segmented into a first array pattern A and a second array pattern B.

In the first array pattern A, the G filters are disposed over the pixels at the four corners and the middle of a square array of 3 by 3 pixels. In the first array pattern A, the R filters are disposed on a vertical line that is central in a horizontal direction of the square array. In the first array pattern A, the B filters are disposed on a horizontal line that is central in the vertical direction of the square array. The second array pattern B is a pattern in which positions of the G filters are the same as in the first basic array pattern A but the positions of the R filters and the B filters are exchanged. The color filter 21 includes a basic array pattern C that is formed of a square array pattern corresponding with 6 by 6 pixels. The basic array pattern C is a pattern of 6 by 6 pixels in which the first array pattern A and the second array pattern B are arrayed with point symmetry. In the color filter 21, the basic array pattern C is arranged repeatedly in the horizontal direction and the vertical direction. Thus, in the color filter 21, the filters for the colors red, green and blue (the R filters, the G filters and the B filters) are arrayed with predetermined periods. Therefore, when synchronization (interpolation) processing or the like is being applied to R, G and B signals read from the imaging element 20, the processing may be performed in accordance with the repeating patterns.

In a case in which thinning processing is applied in units of the basic array pattern C to reduce an image, the color filter array of the thinned, reduced image may be the same as the color filter array without the thinning processing. Thus, the same processing circuits may be employed.

In the color filter 21, the G filters corresponding to the color that contributes most to providing luminance signals (in the present first exemplary embodiment, the color green) are arranged in lines in the horizontal, vertical and diagonal directions of the color filter array. Therefore, regardless of which directions have high frequencies, the reproduction accuracy of synchronization processing in high-frequency regions may be improved.

In the color filter 21, the R filters and B filters corresponding to the two other colors beside the color green (in the present first exemplary embodiment, the colors red and blue) are arranged in lines in the horizontal direction and the vertical direction of the color filter array. Therefore, occurrences of color moire (false colors) may be suppressed. Consequently, there is no need to dispose an optical low pass filter on the optical path from the incidence plane of the optical system to the imaging plane in order to suppress occurrences of false color. Moreover, in a case in which an optical low pass filter is employed, a filter that operates weakly in cutting high-frequency components to prevent occurrences of false color may be employed. Thus, a degradation of resolution may be avoided.

The basic array pattern C may be understood as an array in which the first array pattern A of 3 by 3 pixels, outlined by a broken line frame, and the second array pattern B of 3 by 3 pixels, outlined by a single-dot chain line, are alternatingly arrayed in rows in the horizontal and vertical directions.

In each of the first array pattern A and the second array pattern B, the G filters, which are luminance-related pixels, are disposed at the four corners and the middle, and thus are arranged on both diagonal lines. In the first array pattern A, the B filters are arrayed in the horizontal direction and the R filters are arrayed in the vertical direction, sandwiching the central G filter. By contrast, in the second array filter B, the R filters are arrayed in the horizontal direction and the B filters are arrayed in the vertical direction, sandwiching the central G filter. That is, while positional relationships of the R filters and the B filters are reversed between the first array pattern A and the second array pattern B, the arrangements thereof are otherwise the same.

Figure 5:
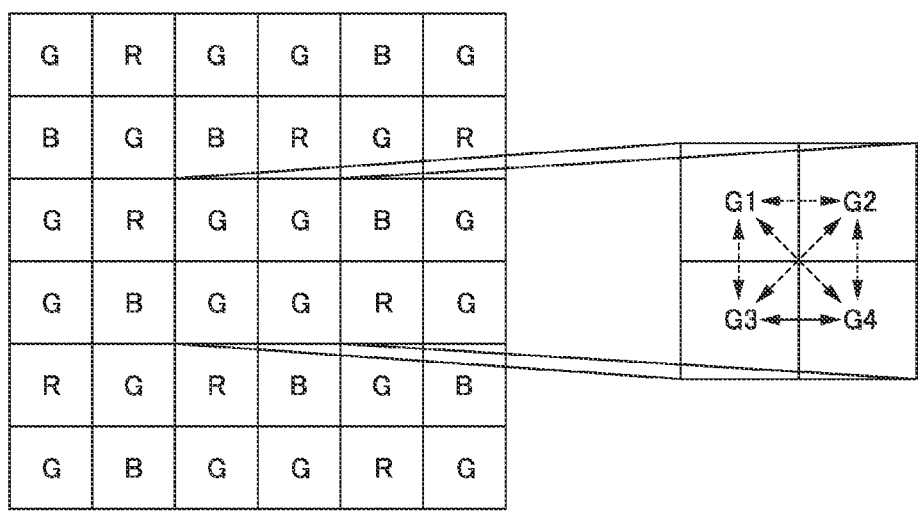
FIG. 5 is a diagram supporting a description of a method for determining a relative direction from pixel values of 2 by 2 G pixels included in the color filter in accordance with the exemplary embodiment.

Because the first array patterns A and the second array patterns B are alternatingly arranged in the horizontal and vertical directions, as shown by the example in FIG. 5, the G filters at the corners of four of the first array patterns A and the second array patterns B form a square array of G filters that corresponds with 2 by 2 pixels. For the 2 by 2 pixels formed by the G filters extracted as illustrated by the example in FIG. 5, an absolute parallax value between pixel values of G pixels in the horizontal direction, an absolute parallax value between pixel values of G pixels in the vertical direction, and absolute parallax values between pixel values of G pixels in the diagonal directions (the top-right to bottom-left diagonal and the top-left to bottom-right diagonal) can be calculated. Hence, it may be determined which of the horizontal direction, the vertical direction and the diagonal directions has a correlation with a direction in which the absolute parallax values are smallest. That is, a direction in which the correlation is highest may be identified from among the horizontal direction, the vertical direction and the diagonal directions using information from G pixels with minimal pixel spacings. The result of this determination may be used in processing to interpolate from surrounding pixels (synchronization processing).

The basic array pattern C of the color filter 21 is arranged with point symmetry about the center of the basic array pattern C (i.e., in the center of the four G filters). Each first array pattern A and second array pattern B within the basic array pattern C is also arranged with point symmetry about the respective central G filter thereof. Consequently, a subsequent processing circuit may be reduced in scale or simplified.

Figure 6:
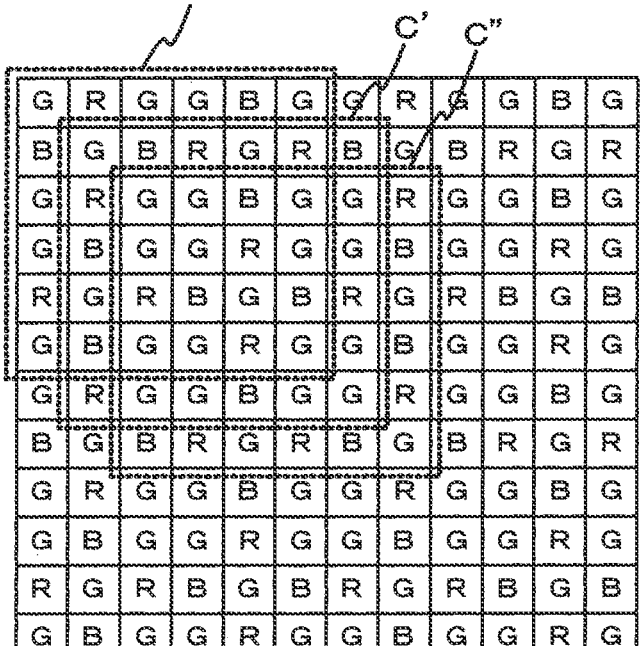
FIG. 6 is a diagram for describing the schematics of a basic array pattern included in the color filter in accordance with the exemplary embodiment.

As illustrated by the example in FIG. 6, of the first to sixth lines of the basic array pattern C in the horizontal direction, a color filter array in the first line and in the third line is GRGGBG, and a color filter array in the second line is BGBRGR. A color filter array in the fourth line and in the sixth line is GBGGRG, and a color filter array in the fifth line is RGRBGB. In the example shown in FIG. 6, basic array patterns C, C' and C" are illustrated.

The imaging device 100 according to the present exemplary embodiment includes a phase difference autofocus (AF) function. The imaging element 20 according to the present exemplary embodiment includes a plural number of pixels for phase difference detection that are used in cases in which the phase difference autofocus function is being operated. The plural pixels for phase difference detection are arranged in a pre-specified pattern.

Figure 7:
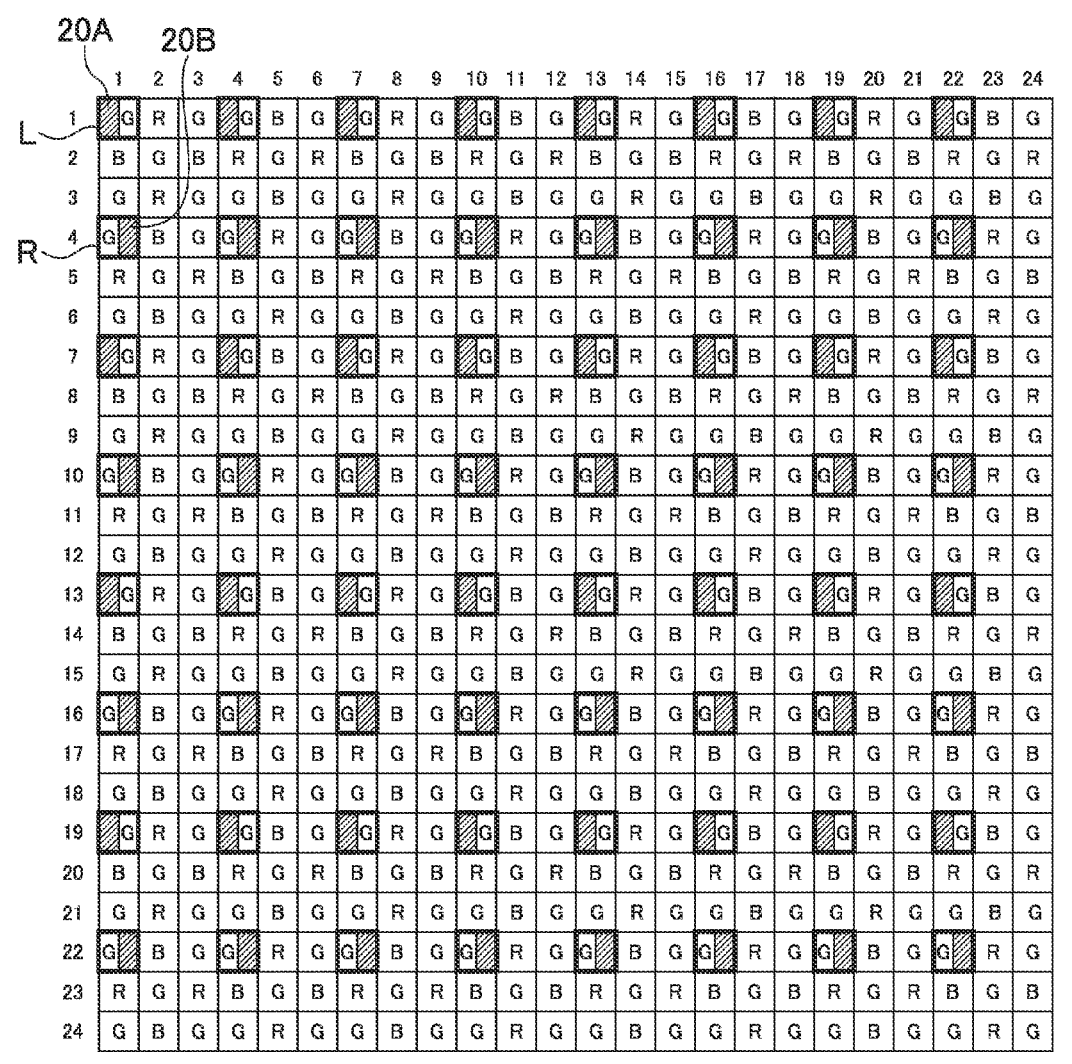

As illustrated by the example in FIG. 7, each pixel for phase difference detection is either a first pixel L or a second pixel R. A horizontal direction left half of each first pixel L is shaded, and a horizontal direction right half of each second pixel R is shaded. Herebelow, in cases in which there is no need to distinguish between the first pixels L and the second pixels R in the descriptions, the term "phase difference pixels" is used.

Figure 8:
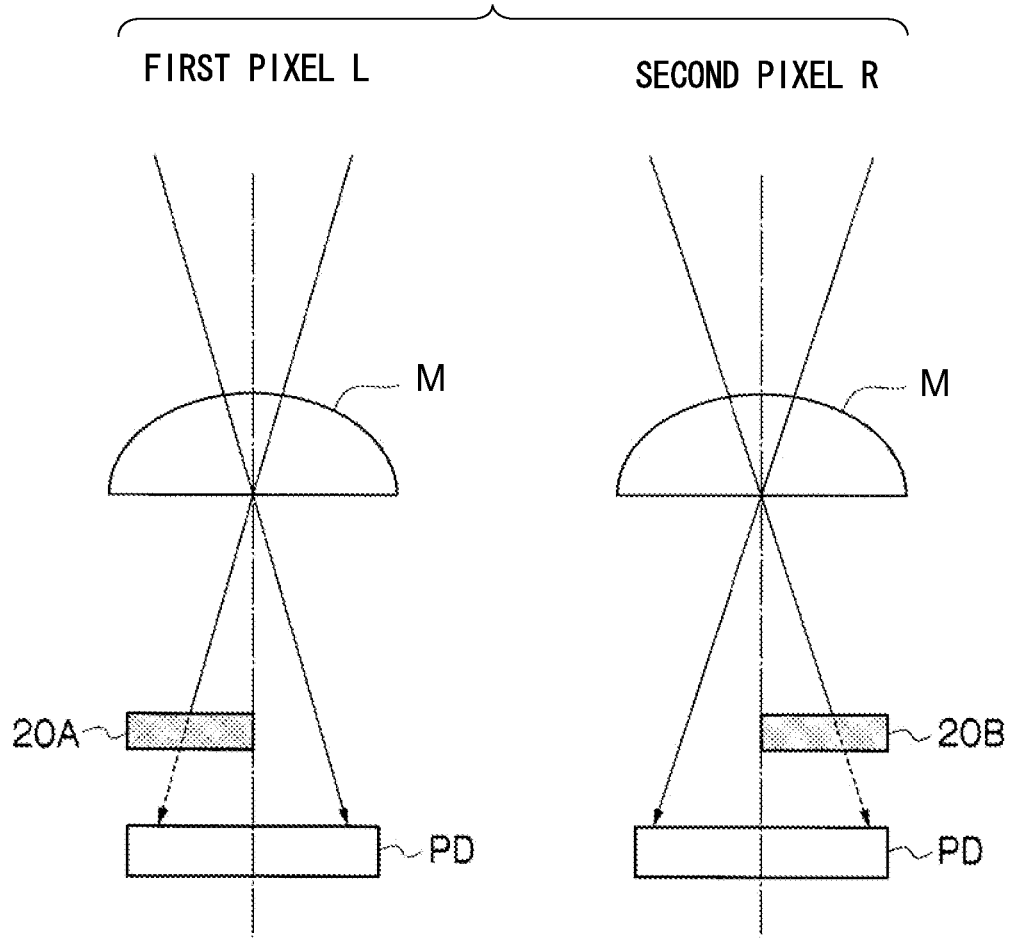
FIG. 8 is a schematic diagram showing an example of the structures of phase difference pixels (a first pixel and a second pixel) of the imaging element of the imaging device in accordance with the exemplary embodiment.

As illustrated by the examples in FIG. 8, each first pixel L includes a shading member 20A, and each second pixel R includes a shading member 20B. The shading member 20A is provided at a front face side (a microlens M side) of a photodiode PD and shades the left half of a light detection surface thereof. Meanwhile, the shading member 20B is provided at the front face side of a photodiode PD and shades the right half of the light detection surface thereof.

The microlenses M and the shading members 20A and 20B function as pupil division portions, with the first pixel L detecting only light flux passing through an exit pupil of the imaging lens 16 at the left side of the optical axis, and the second pixel R detecting only light flux passing through the exit pupil of the imaging lens 16 at the right side of the optical axis. Thus, the light flux passing through the exit pupil is divided between left and right by the microlenses M and shading members 20A and 20B that are the pupil division portions, and the pupil-divided light fluxes are incident on the respective first pixels L and second pixels R.

Of a subject image corresponding to the left half of the light flux passing through the exit pupil of the imaging lens 16 and a subject image corresponding to the right half of the light flux, portions that are focused (in a focused state) are formed at the same positions on the imaging element 20. By contrast, portions with front focus that are focused in front of the subject or with rear focus that are focused behind the subject are incident at respectively different positions on the imaging element 20 (the phases are offset). Therefore, the subject image corresponding to the left half of the light flux and the subject image corresponding to the right half of the optical flux may be acquired as parallax images with different parallaxes (a left eye image and a right eye image).

The imaging device 100 according to the present exemplary embodiment detects phase offset amounts on the basis of pixel values of the first pixels L and pixel values of the second pixels R. By exhibiting the detected phase offset amounts, the imaging device 100 aids adjustment of a focus position of the imaging lens 16 by user operations. Herebelow, in cases in which there is no need to distinguish between the shading members 20A and 20B in the descriptions, the term "shading members" is used without the reference symbols.

The imaging element 20 according to the present exemplary embodiment is classified into a first pixel group, a second pixel group and a third pixel group. The term "first pixel group" refers to, for example, a plural number of the first pixels L, the term "second pixel group" refers to, for example, a plural number of the second pixels R, and the term "third pixel group" refers to, for example, a plural number of usual pixels. The term "usual pixels" used here refers to, for example, pixels other than the phase difference pixels (for example, pixels excluding the shading members 20A and 20B). Herebelow, a raw image represented by image signals outputted from the first pixel group is referred to as a "first image", a raw image represented by image signals outputted from the second pixel group is referred to as a "second image", and a raw image represented by image signals outputted from the third pixel group is referred to as a "third image".

The pixels belonging to the first image group and the second image group are disposed at positions whose positions in horizontal directions between the first pixel group and the second pixel group match up in the same pixel. The pixels belonging to the first image group and the second image group are disposed at positions whose positions in vertical directions between the first pixel group and the second pixel group also match up in the same pixel. In the example shown in FIG. 7, the first pixels L and second pixels R that are in linear patterns in both horizontal directions and vertical directions are disposed with spacings corresponding to plural pixels opened therebetween.

Although the positions of the pixels belonging to the first and second pixel groups are matching positions within the same pixels in the respective horizontal directions and vertical directions in the example shown in FIG. 7, the positions may be fitted within a predetermined number of pixels (for example, within two pixels) in one or both of the horizontal direction and the vertical direction. However, to keep occurrences of image offsetting due to causes other than misfocusing within a maximum, it is preferable if the positions of the pixels belonging to the first and second pixel groups are matching positions within the same pixels in both the horizontal directions and the vertical directions, as illustrated by the example in FIG. 7.

As shown by the example in FIG. 7, the phase difference pixels are provided in correspondence with pixels of the G filters in the square arrays corresponding with 2 by 2 pixels. That is, in the example shown in FIG. 7, pixels at the lower right corners of the 2 by 2 pixels with G filters in the front view of FIG. 7 are assigned to the phase difference pixels.

Thus, in the color filter 21, the shading members are provided at pixels at the lower right corner portions of the 2 by 2 pixels with G filters, and the phase difference pixels are disposed regularly with spacings corresponding to plural pixels therebetween in both the vertical direction and the horizontal direction. Consequently, relatively large numbers of the usual pixels are disposed around the phase difference pixels. Thus, interpolation accuracy in cases in which pixel values for the phase difference pixels are interpolated from pixel values of the usual pixels may be improved. In addition, because the pixels belonging to the first, second and third pixel groups are disposed such that the usual pixels used for interpolation are not multiply provided between the phase difference pixels, a further improvement in interpolation accuracy may be expected.

Returning to FIG. 3, the imaging element 20 outputs image signals representing the first image from the first pixel group (i.e., digital signals representing pixel values of the first pixels), and outputs image signals representing the second image from the second pixel group (i.e., digital signals representing pixel values of the second pixels). The imaging element 20 also outputs image signals representing the third image from the third pixel group (i.e., digital signals representing pixel values of the usual pixels). The third image is a chromatic image, being, for example, a color image of a color array matching the array of the usual pixels. Via the interface section 24, the image data representing the first image, the second image and the third image is temporarily memorized in the non-volatile memory region of the memory 26.

The image processing section 28 includes a usual processing section 30. The usual processing section 30 processes R, G and B signals corresponding to the third pixel group to generate a chromatic usual image, which is an example of a first display image. The image processing section 28 also includes a split image processing section 32. The split image processing section 32 processes the G signals corresponding to the first pixel group and the second pixel group to generate an achromatic split image, which is an example of a second display image. The image processing section 28 according to the present first exemplary embodiment is realized by, for example, an application-specific integrated circuit (ASIC), which incorporates circuits that implement plural functions relating to image processing in a single integrated circuit. The CPU 12 executes a confirmation image display processing program, which is described below, causing the split image processing section 32 to generate the split image and controlling the display unit 213 to display the generated split image. The hardware structure of the image processing section 28 is not limited to an ASIC. For example, alternative hardware structures are possible such as, for example, a programmable logic device, a computer including a CPU, ROM and RAM, or the like.

The encoder 34 converts inputted signals to signals in a different format and outputs the converted signals. The Hybrid Viewfinder 220 includes an LCD 247 that displays an electronic image. A number of pixels in a predetermined direction in the LCD 247 (for example, a number of pixels in a horizontal direction that is a direction in which parallax occurs) is smaller than a number of pixels in the same direction in the display unit 213. The display control section 36 is connected to each of the display unit 213 and the LCD 247, and selectively controls the LCD 247 and the display unit 213, causing an image to be displayed by the LCD 247 or the display unit 213. Herebelow, in cases in which there is no need to distinguish between the display unit 213 and the LCD 247 in the descriptions, they are referred to as "the display device".

The imaging device 100 according to the present first exemplary embodiment is structured to be switchable by the dial 212 between a manual focus mode and an automatic focus mode. When one of the focus modes is selected, the display control section 36 displays a live view image combined with a split image at the display device. When the automatic focus mode is selected by the dial 212, the CPU 12 operates as a phase difference detection section and an automatic focus adjustment section. The phase difference detection section detects a phase difference between the first image outputted from the first pixel group and the second image outputted from the second pixel group. The automatic focus adjustment section controls a lens driving unit (not shown in the drawings), from the device control section 22 via the mounts 256 and 346, and moves the imaging lens 16 to a focus position such that a defocus amount of the imaging lens 16 according to the detected phase contrast is zero. The term "defocus amount" mentioned above includes, for example, a phase offset amount between the first image and the second image.

The eyepiece detection section 37 detects whether a user is looking into the viewfinder eyepiece unit 242, and outputs detection results to the CPU 12. Thus, on the basis of detection results from the eyepiece detection section 37, the CPU 12 may ascertain whether or not the viewfinder eyepiece unit 242 is being used.

The external I/F 39 is connected to a communications network such as a local area network (LAN), the Internet or the like. The external I/F 39 implements exchanges of various kinds of information between external devices (for example, a printer) and the CPU 12 via the communications network. Thus, in a case in which a printer is connected as an external device, the imaging device 100 may output a captured still image to the printer and print the same, and in a case in which a display is connected as an external device, the imaging device 100 may output a captured still image, a live view image or the like to the display and display the same.

Figure 9:
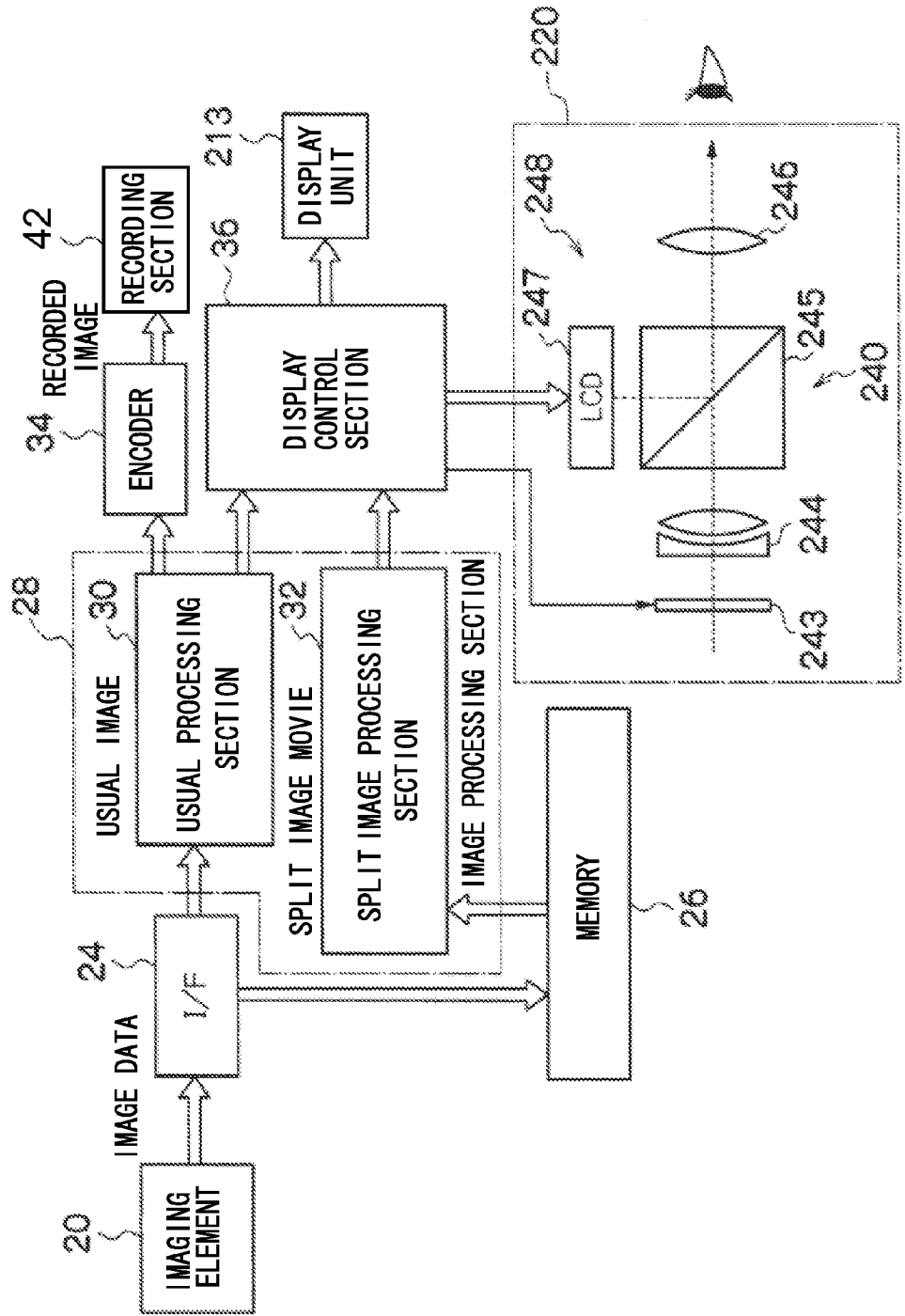
FIG. 9 is a block diagram showing an example of principal functions of the imaging device in accordance with the exemplary embodiment.

Each of the usual processing section 30 and the split image processing section 32 as shown in FIG. 9 includes a white balance gain section, a gamma correction section and a synchronization processing section (which are not shown in the drawings). The respective processing sections sequentially apply signal processing to the original digital signals (raw images) temporarily stored in the memory 26. That is, the white balance gain section implements white balance (WB) by adjusting the gains of the R, G and B signals. The gamma correction section applies gamma correction to the R, G and B signals to which white balance has been applied by the white balance gain section. The synchronization processing section applies color interpolation processing in accordance with the array of the color filter 21 of the imaging element 20, generating synchronized R, G and B signals. The usual processing section 30 and the split image processing section 32 apply this image processing in parallel to the raw images each time the raw images corresponding to one frame are acquired by the imaging element 20.

The usual processing section 30 inputs the raw images of R, G and B from the interface section 24, and interpolates the shaded pixels of the phase difference image among the R, G and B pixels of the third pixel group from surrounding pixels with the same color in the first pixel group and the second pixel group (for example, the neighboring G pixels). Thus, the usual processing section 30 may generate the image that is obtained in the form of a usual image for display and a usual image for recording.

The usual processing section 30 outputs the generated image data of the usual image for recording to the encoder 34. The R, G and B signals processed by the usual processing section 30 are converted to signals for recording (encoded) by the encoder 34, and are recorded at a recording section 42 (see FIG. 9). The usual processing section 30 outputs the generated image data of the usual image for display to the display control section 36. Hereinafter, where it is not necessary to distinguish between the above-mentioned usual image for recording and usual image for display in the descriptions, for convenience of description they are referred to using the term "the usual image", omitting the term "for recording" and the term "for display".

The imaging element 20 may alter respective exposure conditions (for example, the shutter speed of the electronic shutter) for the first pixel group and the second pixel group, and thus may acquire images with different exposure conditions at the same time. Hence, the image processing section 28 may generate a wide dynamic range image on the basis of the images with different exposure conditions. Further, plural images with the same exposure conditions may be acquired at the same time and, by addition of these images, a high sensitivity image with low noise may be generated or a high resolution image may be generated.

Meanwhile, the split image processing section 32 extracts G signals for the first pixel group and the second pixel group from the raw images temporarily memorized in the memory 26, and generates the split image on the basis of the G signals of the first pixel group and the second pixel group. The first pixel group and second pixel group extracted from the raw images are respectively pixel groups based on the G filter pixels as described above. Therefore, on the basis of the G signals of the first pixel group and the second pixel group, the split image processing section 32 may generate an achromatic left parallax image and an achromatic right parallax image. Hereinafter, for convenience of description, the above-mentioned achromatic left parallax image is referred to as "the left eye image" and the above-mentioned achromatic right parallax image is referred to as "the right eye image".

The split image processing section 32 generates the split image by combining the left eye image based on the first image outputted from the first pixel group and the right eye image based on the second image outputted from the second pixel group. Image data of the generated split image is outputted to the display control section 36.

The display control section 36 generates the image data for display on the basis of the image data for recording corresponding to the third pixel group, which is inputted from the usual processing section 30, and the split image corresponding to the first and second pixel groups, which is inputted from the split image processing section 32. For example, the display control section 36 combines the split image represented by the image data inputted from the split image processing section 32 inside a display region of the usual image represented by the image data for recording corresponding to the third pixel group that has been inputted from the usual processing section 30. Image data obtained by this combination is outputted to the display device.

Figure 10:
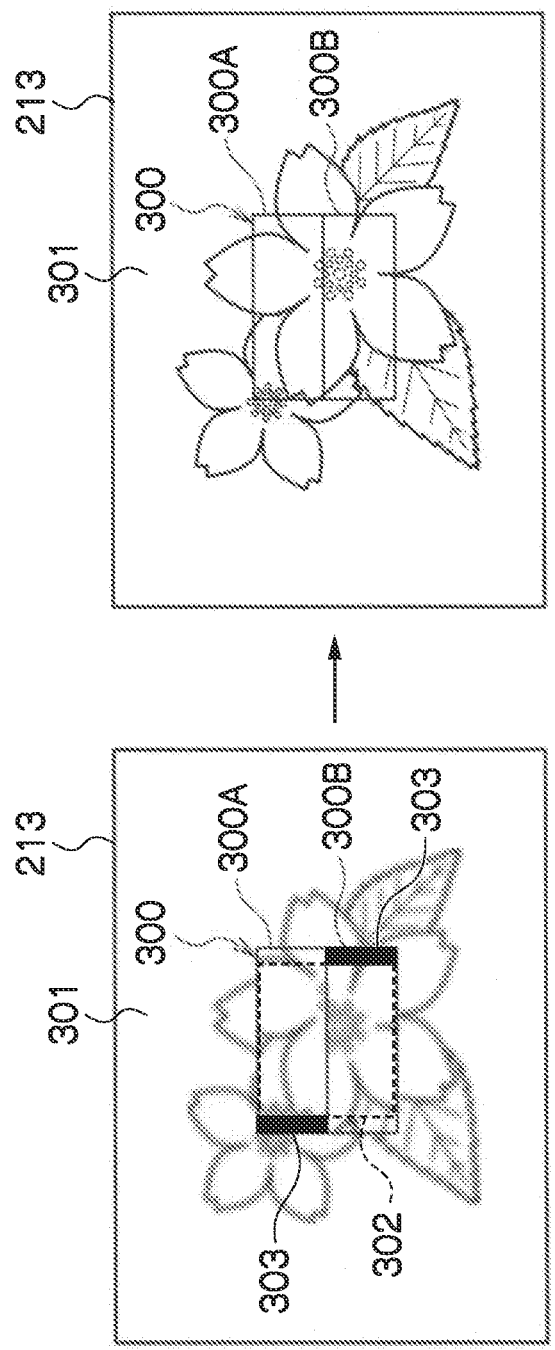
FIG. 10 is front views showing examples of the display appearance of a usual image and a split image in accordance with the exemplary embodiment.

The split image generated by the split image processing section 32 is an image of plural divisions in which portions of the left eye image and portions of the right eye image are combined. The term "image of plural divisions" used here includes, as an example, a split image 300 illustrated in FIG. 10. The split image 300 shown in FIG. 10 is an image in which an upper half divided image and a lower half divided image are combined. The upper half divided image is a divided image for which a left eye image 300A is divided in two in the up-and-down direction of the front view of FIG. 10, and the lower half divided image is a divided image for which a right eye image 300B is divided in the same manner. The split image 300 is an image in which the respective divided images of the left eye image 300A and the right eye image 300B are shifted relative to one another in a pre-specified direction (in the present exemplary embodiment, the left-and-right direction of the front view of FIG. 10) by an amount corresponding to a focus state.

In the present exemplary embodiment, when the split image 300 is combined with a usual image 301, the split image 300 is combined by being fitted in to replace a portion of the usual image. However, a combination method is not limited thus. For example, a combination method is possible in which the split image 300 is superimposed on the usual image 301. A further combination method is possible in which, when the split image 300 is being superimposed, a transparency ratio of the split image 300 is appropriately adjusted and the split image 300 is superimposed with an image portion of the usual image 301 that corresponds with a region that is to be superimposed. Alternatively, the usual image 301 and the split image 300 may be displayed in respectively different layers. Accordingly, the split image 300 may be displayed within a display region of a usual image in a live view image. The term "live view image" includes images that represent the subject images when consecutively captured subject images are consecutively displayed on the screen of the display device.

The Hybrid Viewfinder 220 includes an OVF 240 and an EVF 248. The OVF 240 is a reverse Galilean viewfinder including an object lens 244 and an eyepiece lens 246. The EVF 248 includes the LCD 247, a prism 245 and the eyepiece lens 246.

A liquid crystal shutter 243 is disposed in front of the object lens 244. When the EVF 248 is being used, the liquid crystal shutter 243 blocks light such that no optical image is incident on the object lens 244.

The prism 245 reflects an electronic image and/or various kinds of information displayed at the LCD 247 and guides the electronic image/information to the eyepiece lens 246. The prism 245 also combines an optical image with information (an electronic image and/or various kinds of information) displayed at the LCD 247.

When the viewfinder switching lever 214 is turned in the direction of arrow SW shown in FIG. 1, the mode is alternatingly, each time the lever is turned, switched between an OVF mode and an EVF mode. In the OVF mode, an optical image may be visualized by the OVF 240. In the EVF mode, an electronic image may be visualized by the EVF 248.

In a case of the OVF mode, the display control section 36 performs control such that the liquid crystal shutter 243 is in a non-light-blocking state, and an optical image may be viewed through the viewfinder eyepiece unit 242. The LCD 247 displays only the split image 300. Thus, a through image in which the split image 300 is superimposed on a portion of the optical image may be displayed.

On the other hand, in a case of the EVF mode, the display control section 36 performs control such that the liquid crystal shutter 243 is in the light-blocking state, and just an electronic image displayed at the LCD 247 may be viewed through the viewfinder eyepiece unit 242. Image data equivalent to the image data into which the split image 300 is combined that is outputted to the display unit 213 is inputted to the LCD 247. Thus, an electronic image in which the split image 300 is combined with a portion of the usual image 301 in the same manner as at the display unit 213 may be displayed at the LCD 247.

Image signals representing both the usual image 301 and the split image 300 are inputted to the display device. Here, as shown by the example in FIG. 10, the display device displays the split image 300 represented by the inputted image signals in a display region 302 of the split image 300, which is formed in a rectangular shape at a screen center portion. The display device displays the usual image 301 represented by the inputted image signals at outer periphery regions of the split image 300. In a case in which image signals representing the split image 300 are not inputted but only image signals representing the usual image 301 are inputted, the display device displays the usual image 301 represented by the inputted image signals over the whole of the display region of the display device. Alternatively, in a case in which image signals representing the usual image 301 are not inputted but image signals representing the split image 300 are inputted, the display device displays the split image 300 represented by the inputted image signals in the display region 302, leaving the outer periphery region as a blank region. A frame indicating the display region 302 is not displayed in practice but is shown for convenience of description in FIG. 10.

Herein, the imaging device 100 according to the present exemplary embodiment generates the split image 300 in which the left eye image 300A and the right eye image 300B are combined, and displays the generated split image 300 so as to fit within the display region 302. At this time, depending on, for example, display contents of the left eye image 300A and the right eye image 300B, there may be cases in which the visibility of the shift between the left eye image 300A and the right eye image 300B is reduced and a user may not be able to properly recognize the focus state of the subject image.

Accordingly, the imaging device 100 according to the present exemplary embodiment carries out confirmation image display processing to generate and display the split image 300 with the left eye image 300A and the right eye image 300B being arranged to be respectively shifted to protrude from the display region 302 in opposing directions.

Figure 11:
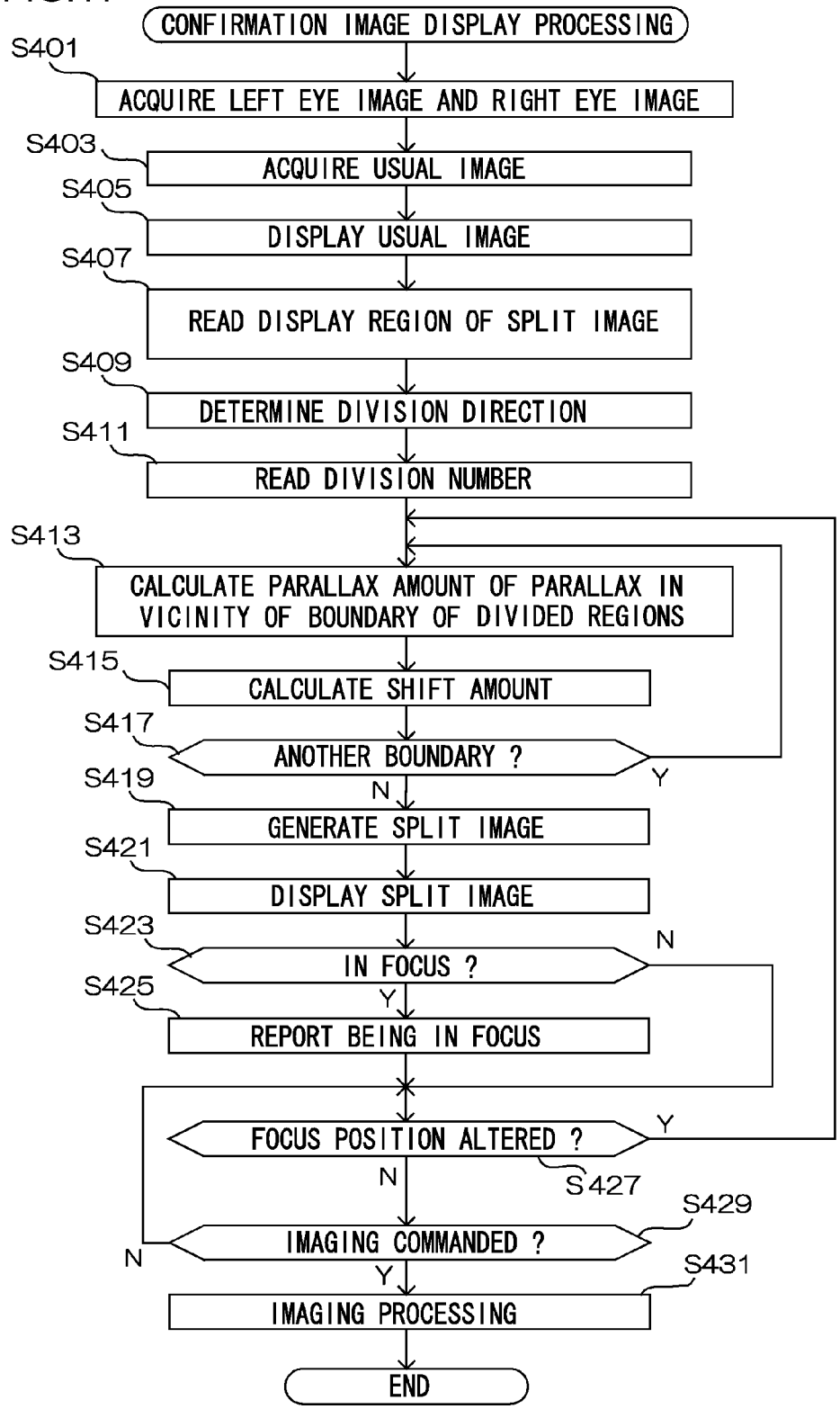
FIG. 11 is a flowchart showing the flow of processing of a confirmation image display processing program in accordance with the exemplary embodiment.

Now, operations of the imaging device 100 relating to the present exemplary embodiment are described referring to FIG. 11. FIG. 11 is a flowchart showing the flow of processing of the confirmation image display processing program that is executed by the CPU 12 when the imaging device 100 has been set to manual focusing and the release button 211 is put into the half-pressed state. This program is memorized in advance in a predetermined memory region (in the present exemplary embodiment, in the memory 26).

Here, a case is illustrated in which the confirmation image display processing is carried out by the CPU 12, but the present invention is not limited thus. For example, the confirmation image display processing may be carried out by the image processing section 28 executing the confirmation image display processing program. Moreover, the imaging device 100 displays the usual image 301 and the split image 300 at one or both of the display unit 213 and the LCD 247, but in the present exemplary embodiment the split image 300 is displayed at the display unit 213.

First, in step S401, image data representing the left eye image 300A based on image signals outputted from the first pixel group and image data representing the right eye image 300B based on image signals outputted from the second pixel group are acquired via the interface section 24. The acquired image data is memorized in a predetermined memory region (for example, the memory 26) by the CPU 12.

Then, in step S403, image data representing the usual image 301 based on image signals outputted from the third pixel group is acquired via the interface section 24. Here, the CPU 12 acquires the image data representing the usual image 301 on the basis of the image signals outputted from the third pixel group, but a method of acquisition of the image data representing the usual image 301 is not limited thus. That is, image data representing the usual image 301 may be generated on the basis of the acquired image data respectively representing the left eye image 300A and the right eye image 300B. As an example of a method of generating the image data representing the usual image 301, a method of using the left eye image 300A or the right eye image 300B as the usual image 301 without alteration can be mentioned. A method is also possible of arranging supplementary pixels between adjacent pixels of the left eye image 300A or the right eye image 300B and generating image data representing the usual image 301 by using the averages of pixel values of pixels surrounding the supplementary pixels as pixel values of the supplementary pixels. As a method of generating the usual image 301, a method is also possible of generating the usual image 301 by combining the left eye image 300A with the right eye image 300B.

In step S405, the CPU 12 performs control to display the usual image 301 at the display unit 213. Although the usual image 301 is displayed at the display unit 213 in the present exemplary embodiment, this is not limiting; the usual image 301 may be displayed at the LCD 247. It is also possible that, in cases in which the eyepiece detection section 37 detects that the user is looking into the viewfinder eyepiece unit 242, the usual image 301 is displayed at the LCD 247, and in other cases the usual image 301 is displayed at the display unit 213.

In step S407, information representing the display region 302 of the display unit 213 (hereinafter referred to as "display region information") is read from the memory 26. In the present exemplary embodiment, information representing the range of the display region 302, represented by pre-specified co-ordinates within a display region of each display device, is memorized in the memory 26 in advance to serve as the display region information.

Instead of reading the display region information, the CPU 12 may specify the display region 302 on the basis of one or more of the left eye image 300A, the right eye image 300B and the usual image 301. In this case, the CPU 12 extracts a pixel group in which differences in pixel values between adjacent pixels in the at least one of the left eye image 300A, the right eye image 300B and the usual image 301 are equal to or more than a pre-specified first threshold value. In the present exemplary embodiment, the first threshold value is one tenth of the dynamic range of pixel values. The CPU 12 then extracts from the extracted pixel group a pixel group of pixels that are successively arranged in the same direction to a number equal to or more than a pre-specified second threshold value. In the present exemplary embodiment, the second threshold value is one third of the length in the division direction of the divided images of the left eye image 300A and the right eye image 300B. Then the CPU 12 uses a region, of regions with a pre-specified size of the display region 302 within the display region of the display device, in which the total area of the above-described pixel group contained in the region is the largest, as the display region 302. Thus, a region in which there are many outlines of objects in the subject is used as the display region 302, and it is easier to see the shifting of the left eye image 300A and the right eye image 300B.

In step S409, the division direction for both the left eye image 300A and the right eye image 300B is determined. In the present exemplary embodiment, information representing a division direction (hereinafter referred to as "division direction information") is memorized in advance in the memory 26, and the division direction is determined by reading out the division direction information.

Instead of reading the division direction information, the CPU 12 may determine the division direction on the basis of one or more of the left eye image 300A, the right eye image 300B and the usual image 301. In this case, the CPU 12 extracts a pixel group in which differences in pixel values between adjacent pixels in the at least one of the left eye image 300A, the right eye image 300B and the usual image 301 are equal to or greater than a pre-specified third threshold value. In the present exemplary embodiment, the first threshold value is one tenth of the dynamic range of pixel values. The CPU 12 then extracts from the extracted pixel group a pixel group of pixels that are successively arranged in the same direction to a number equal to or more than a pre-specified fourth threshold value. In the present exemplary embodiment, the second threshold value is one half of the length in the division direction of the divided images of the left eye image 300A and the right eye image 300B. Then the CPU 12 uses the direction in which the pixels in the extracted pixel group are successive as the division direction. In a case in which there is a plural number of extracted pixel groups, of the directions in which the pixels in each pixel group are successive, a direction in which the pixels are successive in a pixel group in which the differences in pixel values are greatest or a direction in which the pixels are successive in a pixel group in which the number of successive pixels is the greatest may be used as the division direction.

In step S411, information representing respective numbers of divisions of the left eye image 300A and the right eye image 300B (hereinafter referred to as division number information) is read from the memory 26. In the present exemplary embodiment, the division number information is memorized in the memory 26 in advance.

Figure 12:
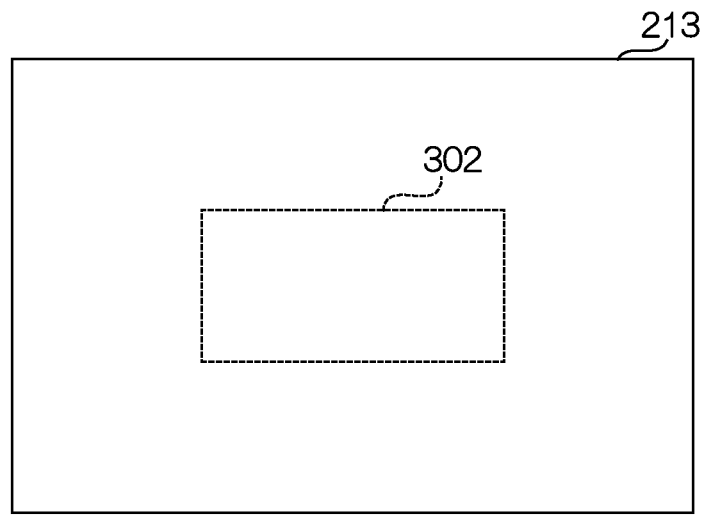
FIG. 12 is a front view showing an example of a split image display region in accordance with the exemplary embodiment.
Figure 13:
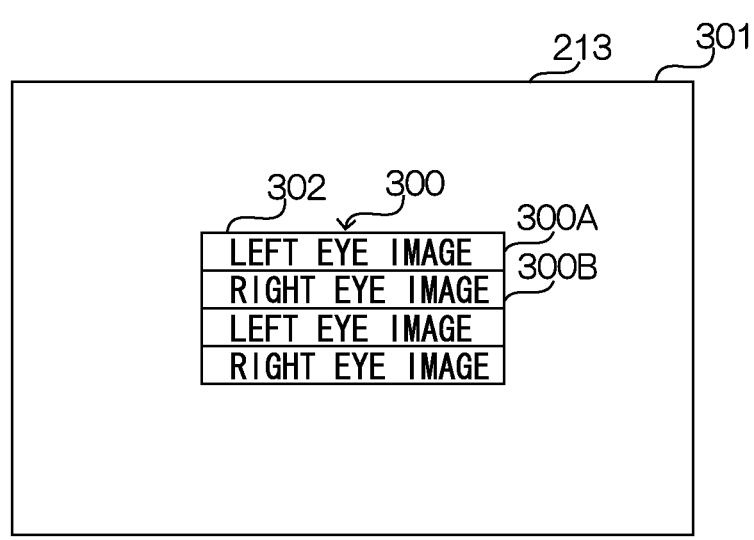
FIG. 13 is a front view showing an example of a method of division of the split image display region in accordance with the exemplary embodiment.

As illustrated by the example in FIG. 12, the display region 302 is set as a portion (for example a central portion) of the display region of the display unit 213. The division direction is the up-and-down direction in the front view of FIG. 13, and the division number is four. In this case, as illustrated by the example in FIG. 13, the CPU 12 divides each of the left eye image 300A and the right eye image 300B into four regions in the up-and-down direction of the front view of FIG. 13.

In step S413, a parallax amount of a parallax between the left eye image 300A and the right eye image 300B is calculated for a pre-specified region that is to contain a boundary between the left eye image 300A and the right eye image 300B when the split image 300 is composed. Here, the CPU 12 extracts correspondence points corresponding to the region of the boundary between the left eye image 300A and the right eye image 300B. The CPU 12 uses an average value of offset amounts between the left eye image 300A and the right eye image 300B at co-ordinate positions of the extracted correspondence points as the parallax amount of the parallax between the left eye image 300A and the right eye image 300B. In the present exemplary embodiment, the pre-specified region containing the boundary is a region formed of pixels whose distances from the boundary are within a pre-specified number of pixels, but this is not limiting. For example, in a case in which some object is present at the boundary, a region corresponding to this object may be detected, and the detected region may be used as the pre-specified region containing the boundary. Alternatively, the pre-specified region containing the boundary may be a region that is used as an object of detection of phase difference in a case in which the autofocus mode is set.

In step S415, the CPU 12 calculates a shift amount of the left eye image 300A and the right eye image 300B for when generating the split image 300. The CPU 12 may directly use the parallax amount calculated by the processing of step S413 described above as the shift amount. In the present exemplary embodiment, however, in order to make the shifts of the left eye image 300A and the right eye image 300B easier to see, the shift amounts are emphasized.

That is, as represented in the following expression (1), this shift amount D' is calculated by multiplying a parallax amount D of the parallax between the left eye image 300A and the right eye image 300B by a pre-specified coefficient α, which is greater than 1.

$$D'=\alpha \times D$$

$$(\alpha>1) \quad (1)$$

That is, the parallax amount D is smaller in a case in which an offset of the focus of the subject image is small than in a case in which the offset is large. Therefore, the user may be able to recognize the offset just by the left eye image 300A and the right eye image 300B being shifted by amounts corresponding to the parallax amount D.

Figure 14:
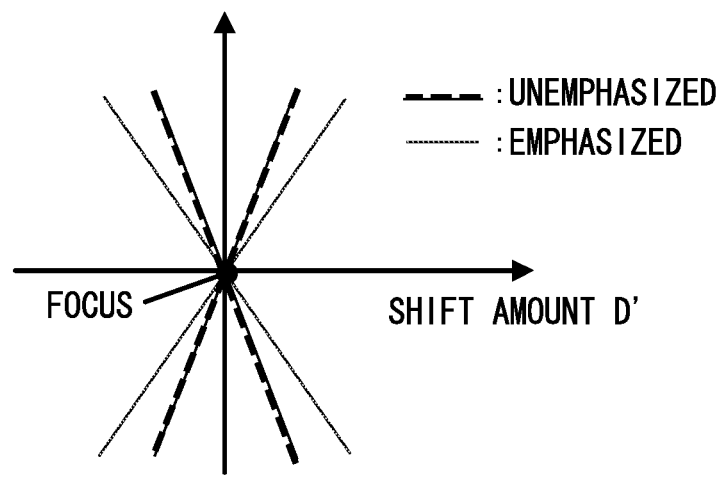
FIG. 14 is a graph showing examples of relationships between lens driving and shift amounts in the imaging device in accordance with the exemplary embodiment.

Thus, as illustrated by the example in FIG. 14, the greater the offset amount of the focus position of the subject image, the greater the shift amount D' is made by the multiplication of the parallax amount D by the coefficient α that is larger than 1. The shifting between the left eye image 300A and the right eye image 300B is linearly emphasized by the shifting of the left eye image 300A and the right eye image 300B that corresponds to the shift amount D'.

Figure 15:
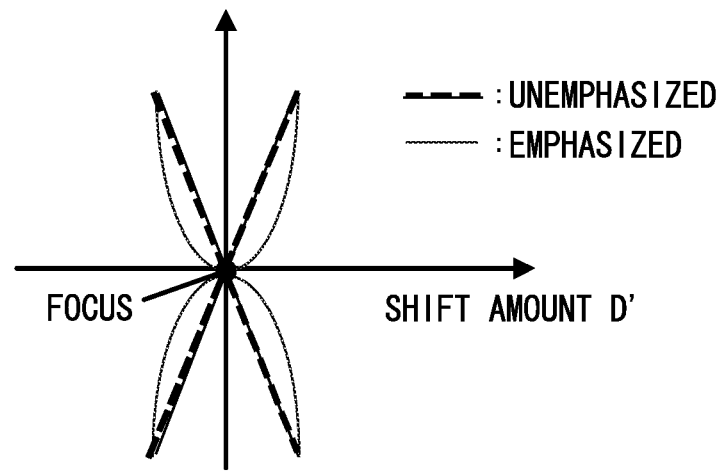
FIG. 15 is a graph showing examples of relationships between lens driving and shift amounts in the imaging device in accordance with the exemplary embodiment.

A method for emphasizing the shifting between the left eye image 300A and the right eye image 300B is not limited thus. For example, as illustrated by the following expression (2) and FIG. 15, the shift amount D' may be calculated by a second-order multiplication of the parallax amount D by a coefficient α that is greater than 1 and for which: the larger the offset amount of the focus position of the subject image, the larger the coefficient α; and the larger the offset amount of the focus position of the subject image, the smaller the rate of increase of the coefficient α.

$$D'=\alpha \times D^2 + \beta \times D$$

$$(\alpha>1) \quad (2)$$

The shifting between the left eye image 300A and the right eye image 300B can be non-linearly emphasized by shifting the left eye image 300A and the right eye image 300B in accordance with this shift amount D'. The symbol β in expression (2) is a pre-specified coefficient.

The coefficients α and β in the above expressions (1) and (2) may be determined from relationships between F-numbers of the imaging lens 16 and the resolutions of the EVF 248 and the imaging element 20. That is, the coefficients α and β may be determined with a view to visibility when the user is looking at the split image 300. For example, when the f-number is higher, offset amounts are smaller. Therefore, it may be that the higher the f-number, the larger the coefficient α. When the resolution of the display device is higher, the effect of shifting of the left eye image 300A and the right eye image 300B is weaker. Therefore, the coefficient α may be made larger as the resolution of the display device is higher.

Then, in step S417, a determination is made as to whether or not there is a boundary, of boundaries between the left eye image 300A and the right eye image 300B in the split image 300, that has not been subjected to the processing of steps 413 and S415. If the result of the determination in step S417 is affirmative, the CPU 12 returns to step S413, and if the result of the determination is negative, the CPU 12 proceeds to step S419.

In step S419, the split image 300 is generated by output to the split image processing section 32 of information representing each of the display region, the division direction, the division number and the shift amounts obtained by the processing described above, and command information commanding the generation of the split image 300.

Figure 16:
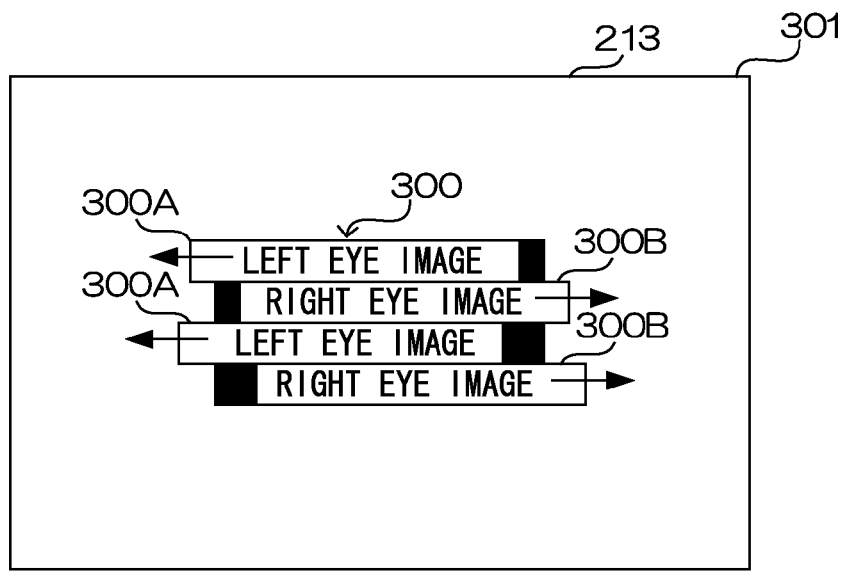
FIG. 16 is a front view showing an example of the display appearance of a split image in accordance with the exemplary embodiment.

In the present exemplary embodiment, the split image processing section 32 arranges plural first divided images, which are parts of the left eye image 300A obtained by dividing the left eye image 300A in the division direction, and plural second divided images, which are images obtained by dividing the right eye image 300B in the same manner as the left eye image 300A and excluding regions corresponding to the plural first divided images of the left eye image 300A. Here, the split image processing section 32 arranges the left eye image 300A and the right eye image 300B alternatingly to generate the split image 300. As illustrated by the example in FIG. 16, the split image processing section 32 arranges the left eye image 300A and the right eye image 300B to be shifted by the calculated shift amounts D' in opposing directions relative to an intersectional direction intersecting the division direction (in the present exemplary embodiment, an orthogonal direction). Here, the left eye image 300A and the right eye image 300B sandwiching each of the aforementioned boundaries are displayed shifted using the shift amount D' corresponding to the respective boundary.

Figure 17:
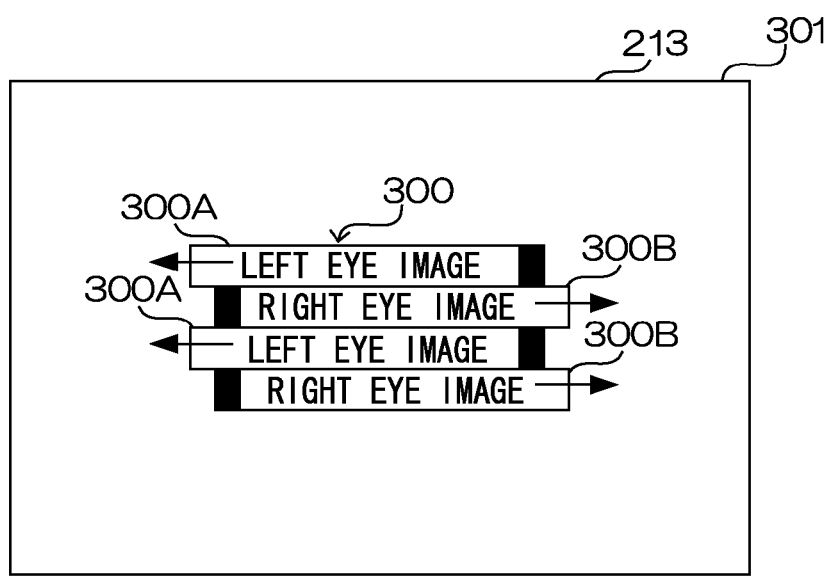
FIG. 17 is a front view showing an example of the display appearance of a split image in accordance with the exemplary embodiment.

In the present exemplary embodiment, the shift amount D' is calculated at each of the above-mentioned boundaries, but this is not limiting. For example, as shown in FIG. 17, an average value of the parallax amounts of parallaxes in the whole region of the left eye image 300A and the right eye image 300B may be calculated, and a uniform shift amount D' corresponding to the calculated average value may be employed for the whole region of the left eye image 300A and the right eye image 300B.

In step S421, the CPU 12 applies control to display the split image 300 generated by the split image processing section 32 at the display region 302 of the display unit 213.

Figure 18:
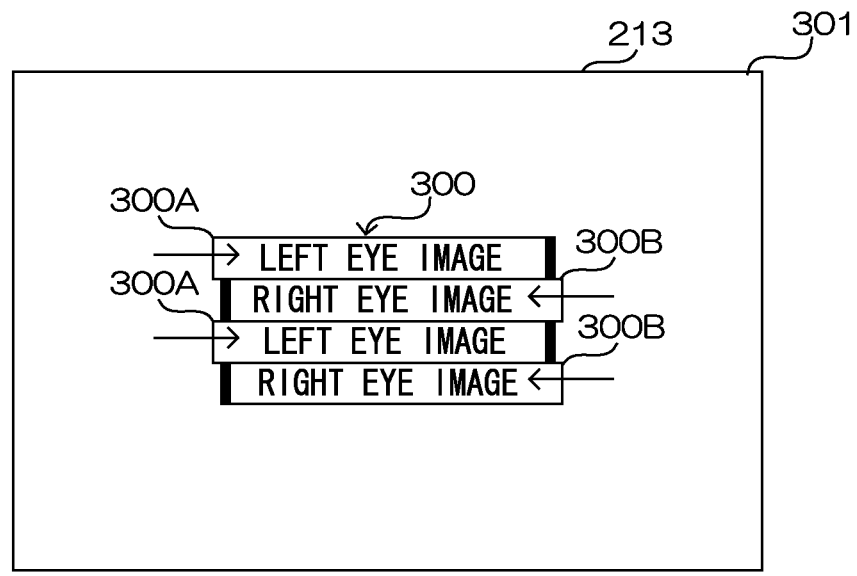
FIG. 18 is a front view showing an example of the display appearance of a split image in accordance with the exemplary embodiment.

As described above, the larger the parallax amounts of the parallaxes between the left eye image 300A and the right eye image 300B in the split image 300, the larger the shift amounts D' in the split image 300. For example, in a case in which the split image 300 is in the state shown in FIG. 16, the focus position has been moved by operation of the focusing ring 260 in a direction that reduces the parallax amounts D of the parallaxes between the left eye image 300A and the right eye image 300B. In this case, as illustrated by the example in FIG. 18, the shifting of the left eye image 300A and the right eye image 300B in the split image 300 is reduced compared to the previous state. That is, by operating the focusing ring 260 while looking at the split image 300, the user may move the focus position in a direction that reduces the shift amounts of the left eye image 300A and right eye image 300B in the split image 300, and thus may focus the subject image.

In step S423, a determination is made as to whether or not the subject image is in focus. Here, the CPU 12 determines that the subject image is in focus in a case in which the parallax amount of a parallax between the left eye image 300A and the right eye image 300B is within a pre-specified range containing zero. In a case in which the result of the determination in step S423 is negative, the CPU 12 proceeds to step S427, which is described below.

Figure 19:
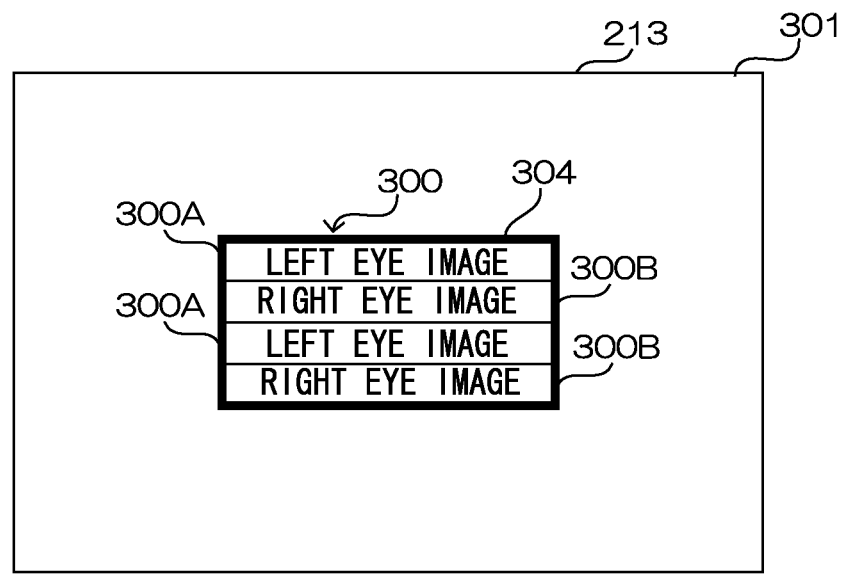
FIG. 19 is a front view showing an example of the display appearance of a split image in accordance with the exemplary embodiment.

On the other hand, if the result of the determination in step S423 is affirmative, the CPU 12 proceeds to step S425, reports to the user that the subject image is in focus, and then proceeds to step S427. In the present exemplary embodiment, a method of this notification may be, for example, as shown in FIG. 19, a method of displaying an outer frame 304 of the split image 300 with a pre-specified coloring, a method of outputting a pre-specified sound, a method of changing coloring of the split image 300 itself, or the like. As a method of changing the coloring of the split image 300 itself, a method may be employed of, for example, displaying the left eye image 300A and the right eye image 300B without color in the split image 300 and introducing color by replacing the left eye image 300A and right eye image 300B with the usual image 301.

In step S427, a determination is made as to whether or not the focus position has been altered by operation of the focusing ring 260 by the user. If the result of the determination in step S427 is affirmative, the CPU 12 returns to the aforementioned step S413, but if the result of the determination is negative, the CPU 12 proceeds to step S429.

In step S429, a determination is made as to whether or not an image capture command has been inputted by a user operation. Here, the CPU 12 determines that an image capture command has been inputted if a full-press operation of the release button 211 is detected. If the result of the determination in step S429 is negative, the CPU 12 returns to the above-mentioned step S427, but if the result of the determination is affirmative, the CPU 12 proceeds to step S431.

In step S431, at the time at which the release button 211 is fully pressed, imaging processing to record the image data representing the usual image 301 to the memory 26 is carried out, and the present confirmation image generation processing program ends. This imaging processing is imaging processing that is ordinarily performed, so is not described here.

Figure 20:
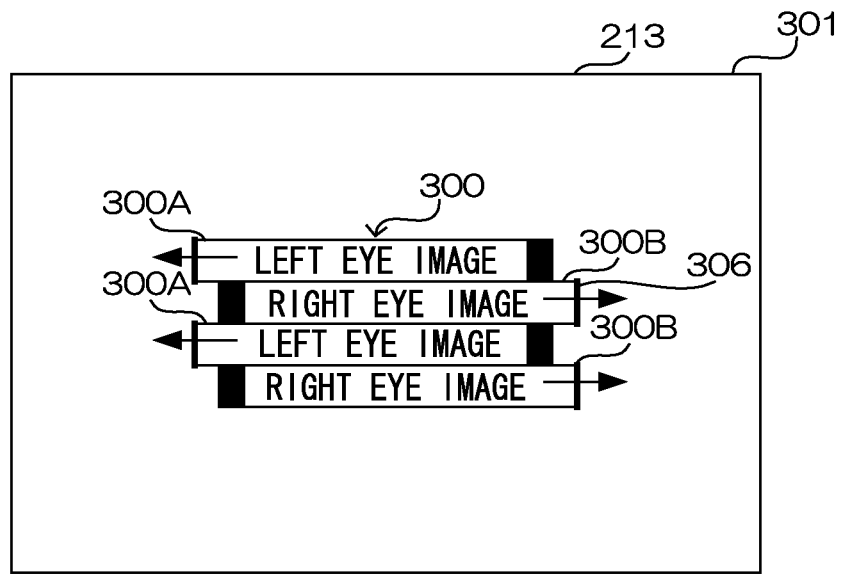
FIG. 20 is a front view showing an example of the display appearance of a split image in accordance with the exemplary embodiment.

In the present exemplary embodiment, even in a case in which the left eye image 300A and the right eye image 300B are displayed shifted, if the coloring of the left eye image 300A and right eye image 300B is close to that of the usual image 301 or the like, a user may not be able to see the shift amounts of the left eye image 300A and the right eye image 300B. In this case, as illustrated in the example in FIG. 20, images 306 that show end portions of the left eye image 300A and the right eye image 300B in the intersectional direction may be displayed in the split image 300. The images 306 are, for example, linear images representing boundary lines between the left eye image 300A and right eye image 300B and the usual image 301. Therefore, by seeing shifting of the images 306 in the split image 300, the user may recognize the shift amounts of the left eye image 300A and the right eye image 300B.

Figure 21:
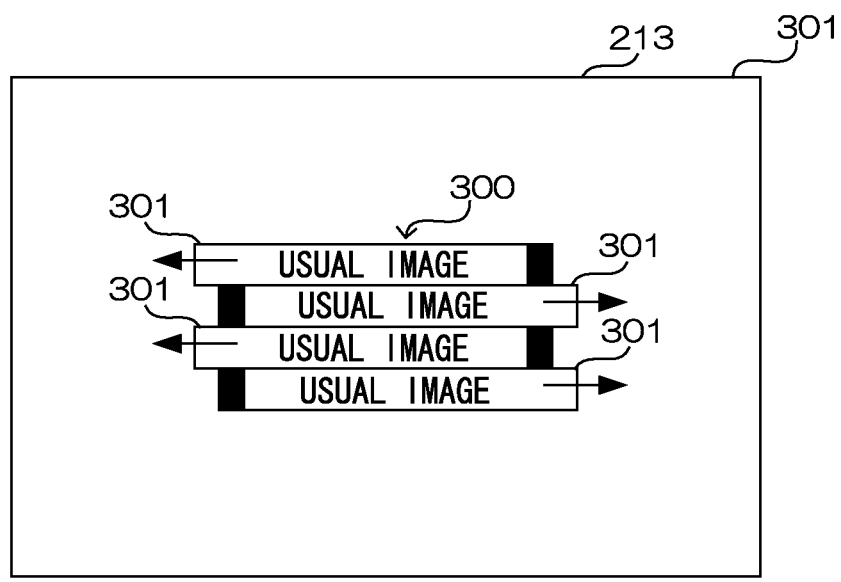
FIG. 21 is a front view showing an example of the display appearance of a split image in accordance with the exemplary embodiment.

In the present exemplary embodiment, the split image 300 is generated using the left eye image 300A and the right eye image 300B but this is not limiting. The split image 300 may be generated using the usual image 301 that is displayed as the subject image. That is, as illustrated by the example in FIG. 21, the usual image 301 may be arranged at the respective arrangement positions described above of the left eye image 300A and the right eye image 300B. In this case, the split image 300 is displayed with the same coloring as the usual image 301 that is the subject image.

As described above, the usual image 301 is displayed in a region excluding the display region 302, and the left eye image 300A and right eye image 300B are displayed shifted and protruding from the display region 302. In this case, as shown at the left side of FIG. 10 and FIG. 22 and the like, non-image regions 303 are produced. Accordingly, as shown in the example at the left side of FIG. 22, the left eye image 300A and the right eye image 300B are shifted in accordance with the shift amounts described above, but in the non-image regions 303 thereof, as shown in the example at the right side of FIG. 22, the pixel values of respective pixels in the non-image regions 303 may be set to the pixel values of the corresponding pixels in the usual image 301.

Figure 23A:
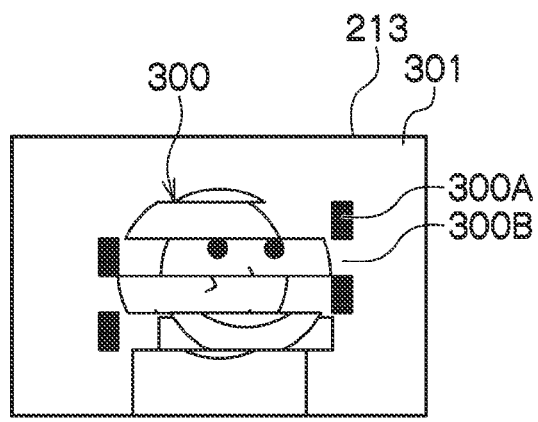
FIG. 23A is a front view showing an example of a method of division of the split image display region in accordance with the exemplary embodiment.
Figure 23B:
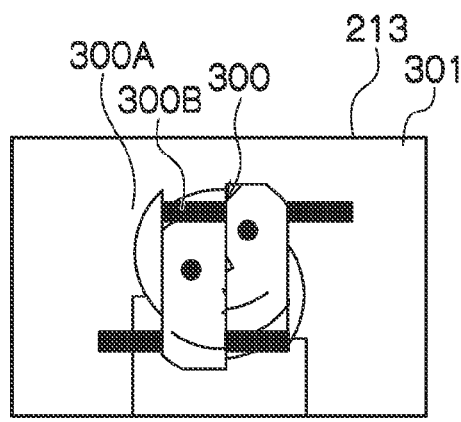
FIG. 23B is a front view showing another example of a method of division of the split image display region in accordance with the exemplary embodiment.

In the present exemplary embodiment, as shown in the example in FIG. 23A, the aforementioned division direction is in the up-and-down direction of the front view of FIG. 23A. However, the division direction is not limited thus and may be an arbitrary direction. That is, as shown in the example in FIG. 23B, the division direction may be the left-and-right direction in the front view of FIG. 13.

Figure 23C:
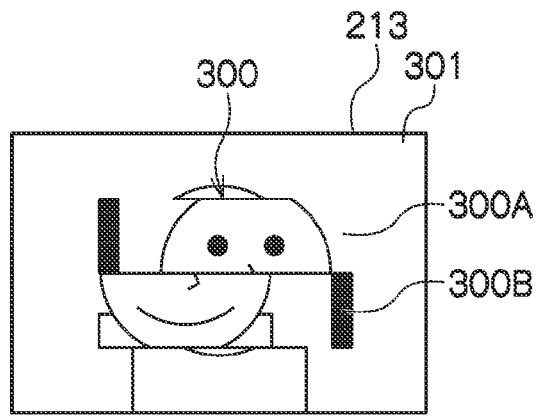
FIG. 23C is a front view showing another example of a method of division of the split image display region in accordance with the exemplary embodiment.

In the present exemplary embodiment, as shown in the example in FIG. 23A, the aforementioned division number is four. However, the division number is not limited thus and may be an arbitrary natural number that is equal to or more than two. Thus, as shown in the example in FIG. 23C, the division number may be two.

Figure 24:
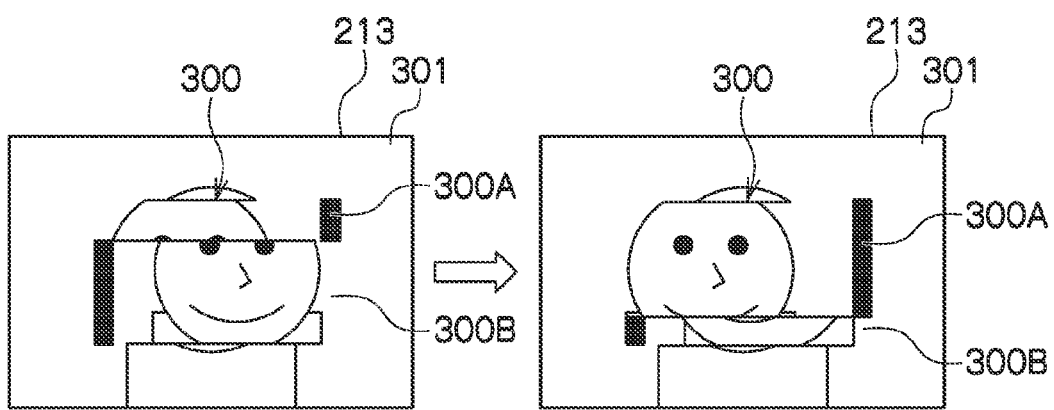
FIG. 24 is front views showing examples of divided images in the split image display region in accordance with the exemplary embodiment.

In the present exemplary embodiment, as described above, the left eye image 300A and the right eye image 300B are divided into a pre-specified division number or a calculated division number in a pre-specified division direction or a calculated division direction. When the CPU 12 is performing control to display the split image 300, in a case in which a command is given by a user operation to alter the division direction, the division number, the positions of the boundaries or the like, then the division direction, the division number, the boundary positions or the like may be altered. For example, as shown at the left side of FIG. 24, the split image 300 is generated with the division direction being the up-and-down direction in the front view of FIG. 24 and the division number being two. In this case, if, for example, the cross-key 222 is pushed in the downward direction by a user operation, then as shown in the example at the right side of FIG. 24, the CPU 12 moves the position of the boundary in the downward direction of the front view of FIG. 24.

Figure 25:
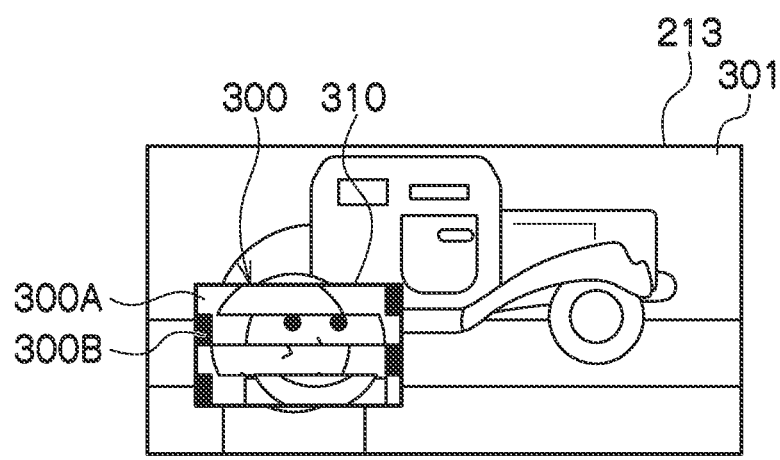
FIG. 25 is a front view showing an example of a divided image in the split image display region in accordance with the exemplary embodiment.

Further, the imaging device 100 according to the present exemplary embodiment includes a face region recognition unit that recognizes a face region showing the face of a person in at least one of the left eye image 300A, the right eye image 300B and the usual image 301. The imaging device 100 may use a face region recognized by the face region recognition unit as the display region 302 of the split image 300. This face region recognition unit detects regions corresponding to the eyes, nose, mouth and the like that structure the face of a person in the subject image and, depending on the sizes and arrangement of these regions, recognizes the region of the face of the person. However, a method of recognition of a face region is not limited thus, and previously known techniques that are commonly used may be employed. In the present exemplary embodiment, as shown by the example in FIG. 25, a face region 310 that is recognized in, for example, the usual image 301 by the face region recognition unit is used as the display region 302 of the split image 300.

Figure 26:
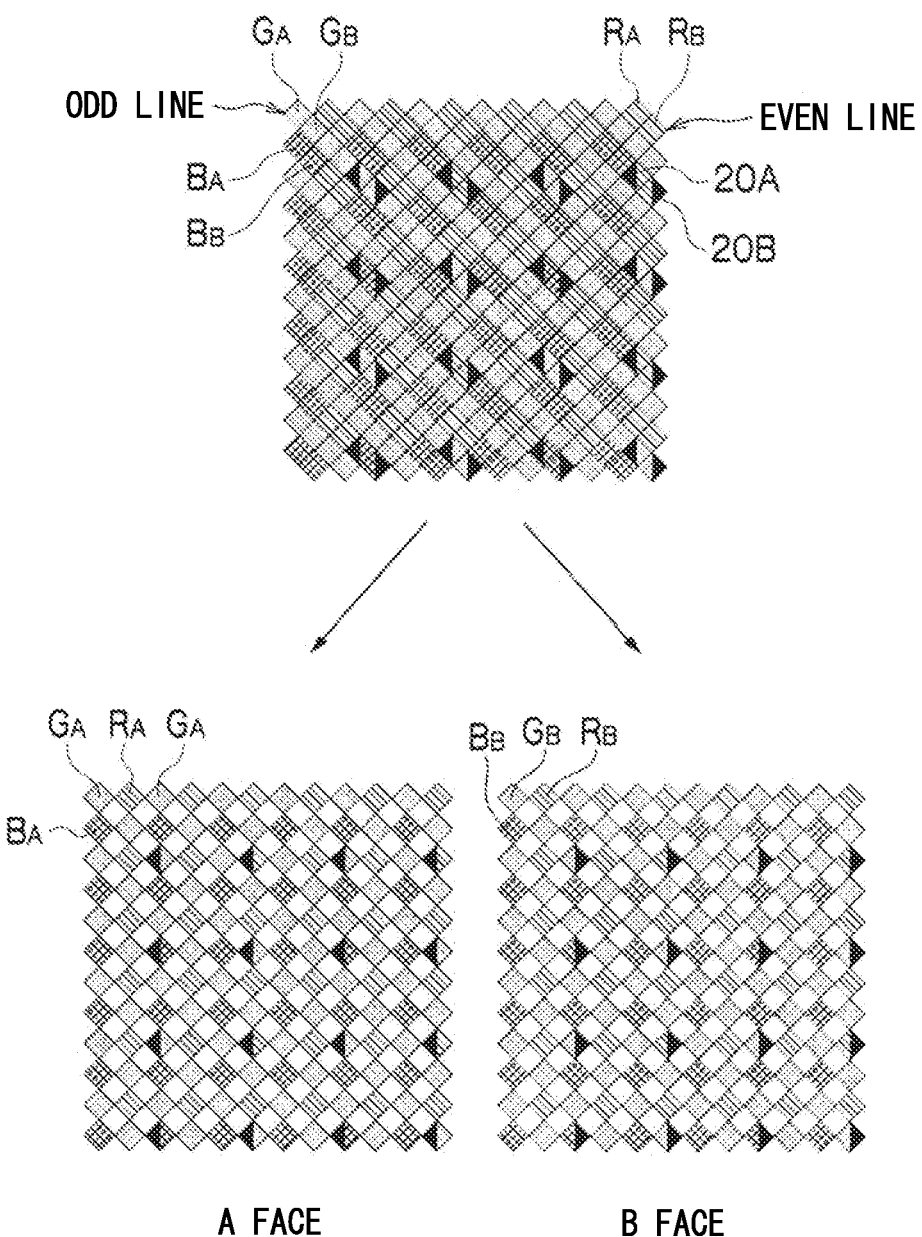
FIG. 26 is a schematic arrangement diagram showing an example of a color filter array and an arrangement of shading members provided at an imaging element of the imaging device in accordance with the exemplary embodiment.

The imaging device 100 according to the present exemplary embodiment includes the shading members 20A and the shading members 20B at the G filters of the color filter 21, but this is not limiting. That is, as illustrated by the example in FIG. 26, the phase difference pixels may be respectively provided at G filter pixels, R filter pixels and B filter pixels. As the R filters, G filters and B filters arranged over the pixels in the imaging element 20 in the example shown in FIG. 26, an A face pixel group and a B face pixel group, which are Bayer arrays, are arranged to be offset from one another by half-pitches in the horizontal direction and the vertical direction. The A face pixel group includes the first pixel group, and the B face pixel group includes the second pixel group. Both the A face pixel group and the B face pixel group respectively include the third pixel group. When this color filter is employed, the split image 300 may be displayed chromatically.

Second Exemplary Embodiment

In the first exemplary embodiment described hereabove, the imaging device 100 is illustrated. A portable terminal device that is a variant example of the imaging device 100 may be, for example, a mobile telephone, a smartphone, a personal digital assistant (PDA), a portable games console or the like that has a camera function. Herebelow, a smartphone is offered as an example and is described in detail while referring to the drawings.

Figure 27:
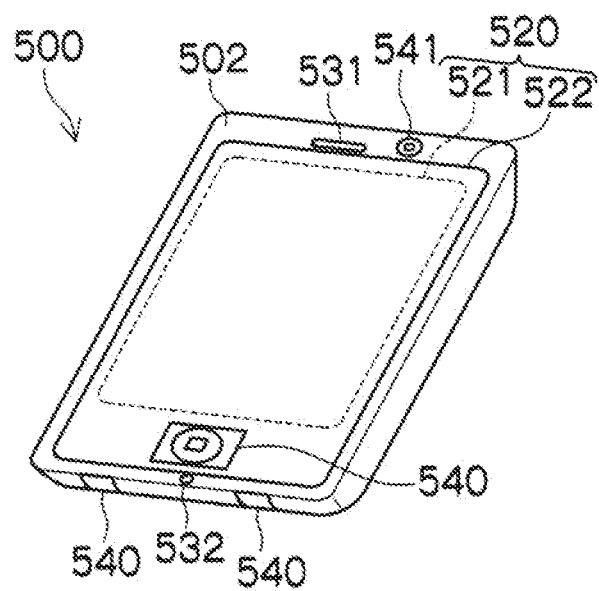
FIG. 27 is a perspective view showing an example of the exterior of a smartphone in accordance with a second exemplary embodiment.

FIG. 27 is a perspective view showing an example of the exterior of a smartphone 500. The smartphone 500 shown in FIG. 27 includes a flat board-shaped casing 502, and includes a display panel 521 and a display and input section 520. The display panel 521 serves as a display section at one face of the casing 502. The display and input section 520 serves as an input section and is integral with an operation panel 522. The casing 502 further includes a speaker 531, a microphone 532, an operation section 540 and a camera section 541. The structure of the casing 502 is not limited thus. For example, a structure may be employed in which the display section and the input section are separate, and a structure may be employed that includes a folding structure, a sliding structure or the like.

FIG. 28 is a block diagram showing an example of structures of the smartphone 500 shown in FIG. 27. As shown in FIG. 28, principal structural elements of the smartphone 500 include a wireless communications section 510, the display and input section 520, a telephone section 530, the operation section 540, the camera section 541, a memory section 550 and an external input/output section 560. The principal structural elements of the smartphone 500 also include a global positioning system (GPS) reception section 570, a motion sensor section 580, a power supply section 590 and a main control section 501. Principal functions of the smartphone 500 include a wireless communications function that implements mobile wireless telecommunications via base stations and a mobile telecommunications network.

In accordance with commands from the main control section 501, the wireless communications section 510 implements wireless communications with a base station incorporated in the mobile telecommunications network. By the use of these wireless telecommunications, various kinds of file data, such as sound data and image data, and e-mail data and the like are transmitted and received, and web data, streaming data and so forth are received.

The display and input section 520 is what is known as a "touch panel", and includes the display panel 521 and the operation panel 522. Accordingly, under the control of the main control section 501, the display and input section 520 displays images (still images and video images), text information and the like and visually delivers information to a user, and also detects user operations relating to the displayed information. In a case in which generated 3D content is to be viewed, it is preferable if the display panel 521 is a 3D display panel.

A display device used as the display panel 521 is an LCD, an organic electroluminescent display (OELD) or the like. The operation panel 522 is mounted such that images displayed on a display screen of the display panel 521 are visible. The operation panel 522 detects one or a number of co-ordinates being operated by a user's fingers, a stylus or the like. When the present device is operated by a user's fingers, a stylus or the like, detection signals generated in response to the operations are outputted to the main control section 501. Hence, on the basis of the received detection signals, the main control section 501 detects operation positions (co-ordinates) on the display panel 521.

As shown in FIG. 27, the display panel 521 and operation panel 522 of the smartphone 500 are made integral to structure the display and input section 520, and the operation panel 522 is arranged so as to completely cover the display panel 521. In a case in which this arrangement is employed, the operation panel 522 may include functions for detecting user operations at regions beyond the display panel 521. In other words, the operation panel 522 may include a detection region for a superimposed portion that overlaps with the display panel 521 (hereinafter referred to as "the display region"), and a detection region for other, outer edge portions that do not overlap with the display panel 521 (hereinafter referred to as "the non-display region").

The size of the display region may completely match the size of the display panel 521, but the two do not necessarily have to match. The operation panel 522 may include two sensing regions, the outer edge portion and an other, inner side portion. The width of the outer side portion may be suitably specified in accordance with the size of the casing 502 and the like. Any system may be employed as a position detection system that is employed in the operation panel 522, such as a matrix switch system, a resistive film system, a surface acoustic wave system, an infrared system, an electromagnetic induction system, an electrostatic capacitance system or the like.

The telephone section 530 includes the speaker 531 and the microphone 532. The telephone section 530 converts user sounds inputted via the microphone 532 to sound data that can be processed by the main control section 501, and outputs the sound data to the main control section 501. The telephone section 530 also decodes sound data received by the wireless communications section 510 or the external input/output section 560, and outputs sounds from the speaker 531. As shown in FIG. 27, the speaker 531 may, for example, be mounted at the same face as the face at which the display and input section 520 is disposed, and the microphone 532 may be mounted at a side face of the casing 502.

The operation section 540 is a hardware button that uses a key switch or the like. The operation section 540 accepts commands from the user. For example, as shown in FIG. 27, the operation section 540 is a push-button switch that is mounted at a side face of the casing 502 of the smartphone 500, is turned on when pressed by a finger or the like, and is turned off by the restoring force of a spring or the like when the finger is removed.

The memory section 550 memorizes a control program and control data for the main control section 501, application software, address data associating names, telephone numbers and the like of communication contacts, and data of e-mails that have been sent and received. The memory section 550 also memorizes web data downloaded by a web browser, downloaded contents data and the like, and temporarily memorizes streaming data. The memory section 550 includes an internal memory section 551 that is built into the smartphone and an external memory section 552 with an external memory slot at which memory can be mounted and removed. Each of the internal memory section 551 and the external memory section 552 constituting the memory section 550 may be realized using a storage medium such as Flash memory, a hard disc or the like. Alternative storage mediums that may be mentioned include a multimedia card (micro type), a card memory (for example, a MicroSD (registered trademark) memory or the like), random access memory (RAM) and read-only memory (ROM).

The external input/output section 560 performs the functions of an interface with all external equipment that is linked to the smartphone 500. The external input/output section 560 is for directly or indirectly connecting to other, external equipment by telecommunications and the like or a network. As examples of telecommunications and the like with other, external equipment, universal serial bus (USB), IEEE 1394 and the like can be mentioned. As examples of a network, the Internet, a wireless LAN, Bluetooth (registered trademark), radio frequency identification (RFID) and infrared communications (Infrared Data Association (IrDA), registered trademark) can be mentioned. Alternative examples of networks include ultra-wide band (UWB, registered trademark), ZigBee (registered trademark) and so forth.

As external equipment that is linked to the smartphone 500, for example, a wired or wireless headset, a wired or wireless external charger, a wired or wireless data port, and a memory card connected via a card socket can be mentioned. As other examples of external equipment, a subscriber identity module (SIM) card or user identity module (UIM) card, and external audio or video equipment connected via an audio/video input/output (I/O) terminal can be mentioned. As alternative external audio and video equipment, external audio and video equipment that is wirelessly connected can be mentioned. In place of external audio and video equipment, for example, a smartphone that is connected by wire or wireless, a personal computer that is connected by wire or wireless, a PDA that is connected by wire or wireless, a personal computer that is connected by wire or wireless, an earphone or the like may be employed.

The external input/output section transfers data received from this external equipment to constituent elements inside the smartphone 500, and transfers data from inside the smartphone 500 to the external equipment.

In accordance with commands from the main control section 501, the GPS reception section 570 detects GPS signals transmitted from GPS satellites ST1 to STn, and executes position calculation processing on the basis of the plural received GPS signals to detect the position of the smartphone 500, constituted by a latitude, a longitude and an altitude. In cases in which position information can be acquired from the wireless communications section 510, the external input/output section 560 or the like (for example, from a wireless LAN), the GPS reception section 570 may detect the position using this position information.

The motion sensor section 580 includes, for example, a triple-axis acceleration sensor or the like. The motion sensor section 580 detects physical movements of the smartphone 500 in accordance with commands from the main control section 501. By detecting physical movements of the smartphone 500, the motion sensor section 580 detects movement directions, accelerations and the like of the smartphone 500. The motion sensor section 580 outputs detection results to the main control section 501.

In accordance with commands from the main control section 501, the power supply section 590 provides electric power stored in a battery (not shown in the drawings) to the respective sections of the smartphone 500.

The main control section 501 includes a microprocessor, operates in accordance with the control program and control data memorized in the memory section 550, and oversees and controls the respective sections of the smartphone 500. The main control section 501 includes a mobile telecommunications control function that controls the respective sections of the telecommunications system, for voice telecommunications and data telecommunications via the wireless communications section 510, and application processing functions.

The application processing functions are realized by the main control section 501 operating in accordance with application software memorized by the memory section 550. The application processing functions may be, for example, an infrared communications function that controls the external input/output section 560 and conducts data communications with adjacent equipment, an e-mail function that implements transmissions and receptions of e-mail, a web browsing function that displays web pages, and the like.

The main control section 501 also includes an image processing function that displays images and the like at the display and input section 520 on the basis of image data (data of still images and video images) such as received data, downloaded streaming data and the like. The image processing function includes functions by which the main control section 501 decodes the image data, applies image processing to the results of decoding, and displays the images at the display and input section 520.

The main control section 501 executes display control for the display panel 521, and operation detection control that detects user operations through the operation section 540 and the operation panel 522.

By executing the display control, the main control section 501 displays software buttons such as icons for launching application software, scroll bars and the like, or a window for composing e-mail. The term "scroll bars" includes software buttons for receiving commands to move a display region of a large image that cannot be fitted into the display region of the display panel 521 or the like.

By executing the operation detection control, the main control section 501 detects user operations via the operation section 540 and, via the operation panel 522, receives operations of the above-mentioned icons, inputs of text in an entry box of the above-mentioned window, and the like. By executing the operation detection control, the main control section 501 also receives requests for scrolling of a displayed image via the scroll bars.

In addition, by executing the operation detection control, the main control section 501 determines whether a position of operation of the operation panel 522 is in the superimposed portion that overlaps with the display panel 521 (the display region) or the other, outer edge portion that does not overlap with the display panel 521 (the non-display region). The main control section 501 includes a touch panel control function that receives the results of determinations and controls the sensing region of the operation panel 522 and the display positions of software buttons.

The main control section 501 may also detect gesture operations of the operation panel 522 and execute pre-specified functions in response to the detected gesture operations. The meaning of the term "gesture operations" includes, as well as conventional simple touch operations, operations of tracing a line or designating a plural number of positions at the same time, with fingers or the like, or performing these in combination and tracing one or more lines from plural positions.

The camera section 541 is a digital camera that captures images using an imaging element such as a CMOS, a CCD or the like. The camera section 541 has similar functions to the imaging device 100 that is illustrated in FIG. 1 and the like.

The camera section 541 is switchable between a manual focus mode and an automatic focus mode. When the manual focus mode is selected, focusing of the imaging lens 16 of the camera section 541 may be implemented by operation of the operation section 540, an icon button for focusing displayed at the display and input section 520, or the like. While the camera section 541 is in the manual focus mode, a live view image into which a split image is combined is displayed at the display panel 521. Thus, a focus state during manual focusing may be confirmed. Further, the Hybrid Viewfinder 220 shown in FIG. 9 may be provided at the smartphone 500.

The camera section 541 converts image data obtained by imaging to compressed image data such as, for example, JPEG (Joint Photographic Coding Experts Group) data or the like, under the control of the main control section 501. The image data obtained by the conversion is recorded to the memory section 550, and may be outputted via the external input/output section 560 or the wireless communications section 510. In the smartphone 500 shown in FIG. 27, the camera section 541 is mounted at the same face as the display and input section 520. However, a mounting position of the camera section 541 is not limited thus; the camera section 541 may be mounted at a rear face of the display and input section 520, or a plural number of the camera section 541 may be mounted. In a case in which a plural number of the camera section 541 are mounted, the camera section 541 that is being used for imaging may be switched and the camera sections 541 may perform imaging individually, or the plural camera sections 541 may be used for imaging simultaneously.

The camera section 541 may be employed in various functions of the smartphone 500. For example, an image obtained by the camera section 541 may be displayed at the display panel 521, an image from the camera section 541 may be employed as an operation input of the operation panel 522, and so forth. Further, when a position is being detected by the GPS reception section 570, the position may be detected with reference to an image from the camera section 541. Further still, by referring to an image from the camera section 541, without using the triple-axis acceleration sensor or in combination with the triple-axis acceleration sensor, an optical axis direction of the camera section 541 of the smartphone 500 may be determined, a current usage environment of the smartphone 500 may be determined, or the like. Obviously, images from the camera section 541 may be utilized by application software.

In addition, various kinds of information may be appended to image data of still images or video images and recorded to the memory section 550, or outputted via the external input/output section 560 or the wireless communications section 510. The term "various kinds of information" used here includes, for example, position information obtained by the GPS reception section 570 with the image data of the still image or video image, and sound information acquired by the microphone 532 (which may be text information converted from voice to text by the main control section or the like). Furthermore, attitude information acquired by the motion sensor section 580 and the like may be included.

In the exemplary embodiments described above, the imaging element 20 that includes the first to third pixel groups is illustrated. However, the present invention is not limited thus. The imaging element may be constituted with only the first pixel group and the second pixel group. A digital camera that includes an imaging element of this type may generate a three-dimensional image (a 3D image) on the basis of the first image outputted from the first pixel group and the second image outputted from the second pixel group, or may generate a two-dimensional image (a 2D image). In this case, the generation of a two-dimensional image is realized by, for example, interpolation processing between corresponding pixels of the same colors in the first pixel group and the second pixel group. The first image and second image may also be employed as a two-dimensional image without interpolation processing.

In the exemplary embodiments described above, an example in which the split image 300 is displayed within the display region of the usual image 301 is presented and described, but the present invention is not limited thus. The split image 300 may be displayed at the display device without the usual image 301 being displayed. Further, in the exemplary embodiments described above, the split image 300 is displayed at a portion of the display region of the display device, but this is not limiting; the split image 300 may be displayed over the whole of the display region of the display device. Thus, the present invention is not limited to modes in which both the usual image 301 and the split image 300 are displayed at the same time on the same screen of the display device. For example, the present invention may also be configured such that, if a command for display of the usual image 301 is cancelled in a state in which display of the split image 300 has been commanded, the display control section 36 performs control to display the split image 300 at the display device without displaying the usual image 301.

The disclosures of Japanese Patent Application No. 2012-205869 are incorporated into the present specification by reference in their entirety. All references, patent applications and technical specifications cited in the present specification are incorporated by reference into the present specification to the same extent as if the individual references, patent applications and technical specifications were specifically and individually recited as being incorporated by reference.

What is claimed is:

1. An image processing device comprising:
   a generation unit that generates a first display image based on image signals outputted from an imaging element that includes first and second pixel groups, at which a subject image passing through first and second regions of an imaging lens is pupil-divided and respectively formed, and generates a second display image from first and second images based on image signals outputted from the first and second pixel groups, the second display image being used for focus confirmation;

a parallax calculation unit that calculates a parallax representing an offset amount between each pixel of the first image and each corresponding pixel of the second image;

a display unit that displays images; and a display control unit that controls to display the first display image generated by the generation unit at the display unit and to display the second display image generated by the generation unit within a display region of the first display image, wherein the generation unit generates the second display image by arranging a first divided image, which is one of a plurality of divided images obtained by dividing the first image in a pre-specified division direction, and a second divided image, which is an image in which regions corresponding to the first divided image are excluded from a plurality of divided images obtained by dividing the second image in the same manner as the first image, to be shifted by an amount corresponding to the parallax in opposing directions in an intersectional direction that intersects with the division direction, and wherein the generation unit extracts a pixel group, in which differences in pixel values between adjacent pixels in at least one of the first image or the second image are equal to or more than a pre-specified first threshold value and the pixels are successively arranged in a number equal to or more than a pre-specified second threshold value in the same direction, and generates the second display image with the division direction being any one direction in which the pixels of the extracted pixel group are successively arranged.

2. The image processing device according to claim 1, wherein the generation unit arranges the first divided image and the second divided image alternatingly in the division direction to generate the second display image.

3. The image processing device according to claim 1, wherein the parallax calculation unit calculates the parallax in a pre-specified region that includes a boundary between the first divided image and the second divided image.

4. The image processing device according to claim 1, wherein the generation unit generates the second display image, with the amount corresponding to the parallax being a value for which the parallax calculated by the parallax calculation unit is multiplied by a pre-specified coefficient that is greater than 1.

5. The image processing device according to claim 4, wherein the generation unit generates the second display image, with the amount corresponding to the parallax being a value for which the parallax calculated by the parallax calculation unit is multiplied by a coefficient, which coefficient becomes larger as the parallax becomes larger, becomes larger at a smaller rate as the parallax becomes larger, and is greater than 1.

6. The image processing device according to claim 1, wherein the generation unit extracts a pixel group, in which differences in pixel values between adjacent pixels in at least one of the first image or the second image are equal to or more than a pre-specified threshold value, and generates the second display image with a region that is a generation object of the second display image being a region, of regions with a pre-specified size, in which a total area of the pixel group contained in the region is the largest.

7. The image processing device according to claim 1, further comprising a face region extraction unit that extracts a face region corresponding to a face from at least one of the first image or the second image, wherein the generation unit generates the second display image with a region that is a generation object of the second display image being a face region extracted by the face region extraction unit.

8. The image processing device according to claim 1, wherein the generation unit generates the second display image by arranging a third divided image and a fourth divided image to be shifted by a distance corresponding to the parallax in opposing directions in the intersectional direction, the third divided image being one of a plurality of divided images obtained by dividing a third image in the division direction, the third image being based on image signals outputted from a third pixel group at which the subject image is formed without being pupil-divided and that outputs image signals representing the third image, and the fourth divided image being an image in which regions corresponding to the third divided image are excluded from the plurality of divided images.

9. The image processing device according to claim 1, wherein:

the generation unit generates a third display image that is a third image based on image signals outputted from a third pixel group, at which the subject image is formed without being pupil-divided and that outputs image signals representing the third image, and the display control unit, before controlling to display the first display image generated by the generation unit at the display unit and to display the second display image generated by the generation unit within the display region of the first display image, further controls to display the third display image generated by the generation unit at the display unit.

10. The image processing device according to claim 1, wherein the display control unit further controls to display an image representing an intersectional direction end portion of the second display image at the display unit.

11. The image processing device according to claim 1, wherein:

in a case in which the second display image is displayed to be superimposed on the first display image in a second display region, which is a display region in a display region of the display unit that excludes a pre-specified first display region in which the second display image is displayed, the display control unit displays the second display image with the pixel values of pixels in a region of the first display region in which pixels corresponding to the second display image are not present, due to the first divided image and the second divided image being arranged to be shifted, being pixel values of pixels corresponding to that region in the first display image.

12. A display device comprising:

the image processing device according to claim 1;

an imaging lens; and an imaging element that acquires a subject image passing through the imaging lens as image signals.

13. A non-transitory computer readable medium storing a program causing a computer to function as:

a generation unit that generates a first display image based on image signals outputted from an imaging element that includes first and second pixel groups, at which a subject image passing through first and second regions of an imaging lens is pupil-divided and respectively formed, and generates a second display image from first and second images based on image signals outputted from the first and second pixel groups, the second display image being used for focus confirmation;

a parallax calculation unit that calculates a parallax representing an offset amount between each pixel of the first image and each corresponding pixel of the second image; and a display control unit that controls to display the first display image generated by the generation unit at a display unit and to display the second display image generated by the generation unit within a display region of the first display image, wherein the generation unit generates the second display image by arranging a first divided image, which is one of a plurality of divided images obtained by dividing the first image in a pre-specified division direction, and a second divided image, which is an image in which regions corresponding to the first divided image are excluded from a plurality of divided images obtained by dividing the second image in the same manner as the first image, to be shifted by an amount corresponding to the parallax in opposing directions in an intersectional direction that intersects with the division direction, and wherein the generation unit extracts a pixel group, in which differences in pixel values between adjacent pixels in at least one of the first image or the second image are equal in or more than a pre-specified first threshold value and the pixels are successively arranged to a number equal to or more than a pre-specified second threshold value in the same direction, and generates the second display image with the division direction being any one direction in which the pixels of the extracted pixel group are successively arranged.

14. An image processing method comprising:

generating a first display image based on image signals outputted from an imaging element that includes first and second pixel groups, at which a subject image passing through first and second regions of an imaging lens is pupil-divided and respectively formed, and generating a second display image from first and second images based on image signals outputted from the first and second pixel groups, the second display image being used for focus confirmation;

calculating a parallax representing an offset amount between each pixel of the first image and each corresponding pixel of the second image;

controlling to display the first display image generated by the generating at a display unit and to display the second display image generated by the generating within a display region of the first display image, wherein the generating further includes generating the second display image by arranging a first divided image, which is one of a plurality of divided images obtained by dividing the first image in a pre-specified division direction, and a second divided image, which is an image in which regions corresponding to the first divided image are excluded from a plurality of divided images obtained by dividing the second image in the same manner as the first image, to be shifted by an amount corresponding to the parallax in opposing directions in an intersectional direction that intersects with the division direction, and wherein the generating further includes extracting a pixel group, in which differences in pixel values between adjacent pixels in at least one of the first image or the second image are equal to or more than a pre-specified first threshold value and the pixels are successively arranged in a number equal to or more than a pre-specified second threshold value in the same direction, and generating the second display image with the division direction being any one direction in which the pixels of the extracted pixel group are successively arranged.

* * * * *